US012677290B2

(12) United States Patent
Song et al.

(10) Patent No.: US 12,677,290 B2
(45) Date of Patent: Jul. 7, 2026

(54) PHYSICAL DOWNLINK CONTROL CHANNEL DETECTION METHOD AND RELATED APPARATUS

(71) Applicant: DATANG MOBILE COMMUNICATIONS EQUIPMENT CO., LTD., Beijing (CN)

(72) Inventors: Lei Song, Beijing (CN); Xin Su, Beijing (CN); Qiubin Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 335 days.

(21) Appl. No.: 18/552,923

(22) PCT Filed: Mar. 25, 2022

(86) PCT No.: PCT/CN2022/083174
§ 371 (c)(1),
(2) Date: Sep. 28, 2023

(87) PCT Pub. No.: WO2022/206622
PCT Pub. Date: Oct. 6, 2022

(65) Prior Publication Data
US 2024/0179719 A1 May 30, 2024

(30) Foreign Application Priority Data
Apr. 2, 2021 (CN) .......................... 202110362885.X

(51) Int. Cl.
*H04W 72/23* (2023.01)

(52) U.S. Cl.
CPC .................................. *H04W 72/23* (2023.01)

(58) Field of Classification Search
CPC ...................................................... H04W 72/23
See application file for complete search history.

(56) References Cited

U.S. PATENT DOCUMENTS

| | | | | |
|---|---|---|---|---|
| 11,696,232 B2 * | 7/2023 | Xu | .................... | H04W 52/0235 |
| | | | | 370/310 |
| 2012/0063349 A1 * | 3/2012 | Kim | .................... | H04L 27/2647 |
| | | | | 370/252 |

(Continued)

FOREIGN PATENT DOCUMENTS

| | | |
|---|---|---|
| CN | 110830205 A | 2/2020 |
| CN | 111615802 A | 9/2020 |

(Continued)

OTHER PUBLICATIONS

LG Electronics, "Discussion on PDCCH monitoring for reduced capability NR devices", 3GPP TSG RAN WG1 #103-e, e-Meeting, Oct. 26-Nov. 13, 2020, total 6 pages, R1-2008049.

(Continued)

*Primary Examiner* — Brenda H Pham
(74) *Attorney, Agent, or Firm* — KILPATRICK TOWNSEND & STOCKTON LLP

(57) ABSTRACT

Provided in the present application are a physical downlink control channel detection method and a related apparatus. A terminal device receives indication information sent by a network device side, wherein the indication information may include an association relationship between search space sets, and a monitoring mode of the terminal device.

17 Claims, 3 Drawing Sheets

---

For each monitoring unit, complexity of one candidate detection unit in the associated monitoring occasions is determined as first complexity, and complexity of one candidate detection unit of any unassociated monitoring occasion is determined as second complexity ⟋301

Based on a monitoring capability of the terminal device in the monitoring unit, a candidate detection unit is determined from candidate detection units contained in the monitoring unit for detection ⟋302

(56) References Cited

U.S. PATENT DOCUMENTS

| | | | | |
|---|---|---|---|---|
| 2016/0353440 A1* | 12/2016 | Lee | ........................ | H04W 52/50 |
| 2020/0029316 A1* | 1/2020 | Zhou | ................. | H04W 52/0206 |
| 2020/0351682 A1* | 11/2020 | Cirik | .................... | H04W 76/28 |
| 2021/0037607 A1 | 2/2021 | Hamidi-Sepehr et al. | | |
| 2021/0084620 A1 | 3/2021 | Tooher et al. | | |
| 2022/0369298 A1* | 11/2022 | Lin | ........................ | H04L 5/0096 |

FOREIGN PATENT DOCUMENTS

| | | | |
|---|---|---|---|
| CN | 111865479 A | 10/2020 |
| CN | 112398572 A | 2/2021 |
| CN | 112398629 A | 2/2021 |
| CN | 112586042 A | 3/2021 |
| WO | 2020033647 A1 | 2/2020 |
| WO | 2020246858 A1 | 12/2020 |
| WO | 2021024184 A1 | 2/2021 |

OTHER PUBLICATIONS

3GPP TS 38.213 V16.5.0,3rd Generation Partnership Project; Technical Specification Group Radio Access Network; NR; Physical layer procedures for control (Release 16), total 183 pages, Mar. 2021.

* cited by examiner

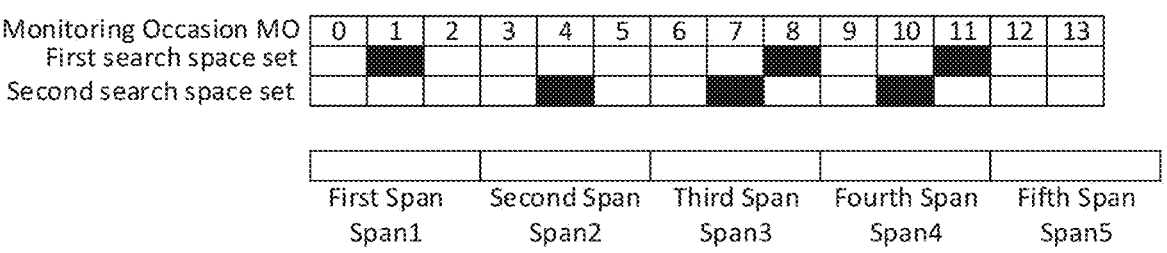

| Monitoring Occasion MO | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| First search space set | | ■ | | | ■ | | | | ■ | | | ■ | | |
| Second search space set | | | | | | ■ | | | ■ | | | ■ | | | |

| First Span | Second Span | Third Span | Fourth Span | Fifth Span |
|---|---|---|---|---|
| Span1 | Span2 | Span3 | Span4 | Span5 |

For each monitoring unit, complexity of one candidate detection unit in the associated monitoring occasions is determined as first complexity, and complexity of one candidate detection unit of any unassociated monitoring occasion is determined as second complexity

302

Based on a monitoring capability of the terminal device in the monitoring unit, a candidate detection unit is determined from candidate detection units contained in the monitoring unit for detection

FIG. 3

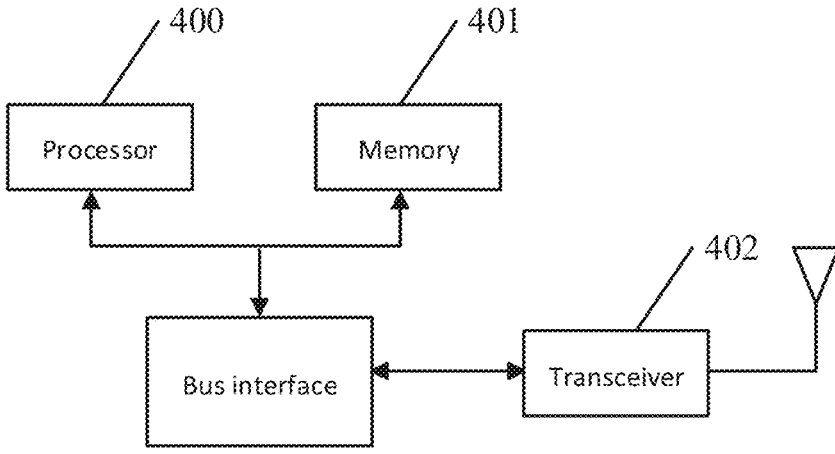

FIG. 4

PHYSICAL DOWNLINK CONTROL CHANNEL DETECTION METHOD AND RELATED APPARATUS

CROSS-REFERENCE TO RELATED APPLICATIONS

The present application is a National Stage of International Application No. PCT/CN2022/083174, filed on Mar. 25, 2022, which claims priority to Chinese Patent Application No. 202110362885.X, filed with the China National Intellectual Property Administration on Apr. 2, 2021 and entitled "Detection Method for Physical Downlink Control Channel and Related Apparatus", which is hereby incorporated by reference in its entirety.

FIELD

The present application relates to the field of wireless communication technologies, and particularly to a detection method for a physical downlink control channel and a related apparatus.

BACKGROUND

In a New Radio (NR) system, a Physical Downlink Control Channel (PDCCH) is transmitted through a PDCCH candidate in a Search Space set (SS set). In the NR, the PDCCH candidate is defined as a candidate resource occupied by a PDCCH during transmission. The network device side may configure a certain number of PDCCH candidates for a terminal, and the number may be greater than the blind detection capability of the terminal, to increase the scheduling flexibility of the network side. In the related art, the blind detection capability of the terminal is defined according to the number of PDCCHs that can be detected.

When the terminal detects the PDCCH, the terminal may firstly determine a range of PDCCH candidates not exceeding the blind detection capability of the terminal according to an order of index values of SS sets where the PDCCH candidates are located in ascending order, and then perform the detection on the determined PDCCH candidates.

In a case that a terminal device monitors PDCCH candidates through blind detection, considering that there are a large number of PDCCH candidates, there is a situation that the blind detection capability of the terminal device cannot complete the detection of all PDCCH candidates, leading to a possibility that there are PDCCH candidates not detected by the terminal device, and thus causing failure of the PDCCH transmission.

SUMMARY

The present application provides a detection method for a physical downlink control channel and a related apparatus, to solve the problem of failure of the PDCCH transmission because the terminal device monitors PDCCH candidates through blind detection in the prior art.

In a first aspect, an embodiment of the present application provides a detection method for a physical downlink control channel, applied to a terminal device and includes:

receiving indication information of a PDCCH sent by a network device side, where the indication information at least includes an association relationship between search space sets and a specific monitoring mode;

determining associated monitoring occasions of the PDCCH according to the indication information; and detecting the PDCCH according to the associated monitoring occasions.

In the embodiment of the present application, the association relationship between search space sets is used to indicate which search space sets have the association relationship, and the search space sets with the association relationship are potential search space sets carrying the associated monitoring occasions.

In some possible embodiments, search space sets with an association relationship include a first search space set and a second search space set.

In the embodiments of the present application, based on the association relationship between the first search space set and the second search space set, it is helpful for the terminal device to determine the associated monitoring occasions in the first search space set and the second search space set, reducing the processing complexity of the terminal device.

In some possible embodiments, the determining the associated monitoring occasions of the PDCCH according to the indication information, includes:

in a case that the specific monitoring mode is a per span monitoring mode, determining that an association mode of the monitoring occasions is associating a monitoring occasion of the first search space set with a monitoring occasion of the second search space set based on the indication information.

In the embodiments of the present application, the terminal device determines the associated monitoring occasions and the corresponding search space sets according to the received indication information, to reduce the detection range for PDCCH detection.

In some possible embodiments, the determining the associated monitoring occasions of the PDCCH according to the indication information, includes:

in a case that the specific monitoring mode is a per span monitoring mode, determining that a repeated transmission mode of the PDCCH is intra-span repeated transmission based on the indication information; or, in a case that the indication information further includes configuration information of intra-span repeated transmission, determining that the repeated transmission mode of the PDCCH is intra-span repeated transmission;

where the associated monitoring occasions are within a same span.

In the embodiments of the present application, the terminal device can determine the associated monitoring occasions within the same span, to effectively reduce the number of times of blind combination. In addition, the network device side can also instruct the terminal device to determine the associated monitoring occasions according to the intra-span repeated transmission by an explicit notification, to flexibly schedule the intra-span repeated transmission and other repeated transmissions.

In some possible embodiments, for the intra-span repeated transmission mode, in a case that the first search space set and the second search space set in the same span have the same number of monitoring occasions, monitoring occasions of the first search space set within the span and monitoring occasions of the second search space set within the span are the associated monitoring occasions.

In the embodiments of the present application, the associated monitoring occasions can be determined in a simple manner within the same span, consuming fewer terminal resources and reducing the complexity.

In some possible embodiments, the method further includes:

in a case that the number of monitoring occasions in the first search space set is not equal to the number of monitoring occasions in the second search space set within the same span, any of the following cases is included:

case 1: a monitoring occasion of the first search space set in the span and a monitoring occasion of the second search space set in the span are the associated monitoring occasions;

case 2: monitoring occasions of the first search space set and the second search space set are all unassociated monitoring occasions; and case 3: monitoring occasions in the first search space set in the span are all unassociated monitoring occasions, and the $n^{th}$ monitoring occasion and the $m^{th}$ monitoring occasion in the second search space set in the span are associated monitoring occasions, where n and m satisfy a predefined relationship, and both m and n are positive integers.

In the embodiments of the present application, the case of repeated transmission in the same span is provided, and a solution of how to understand which monitoring occasions are associated monitoring occasions is provided, thereby reducing the number of times of blind combination on the terminal device side and improving the success rate of PDCCH transmission.

In some possible embodiments, the determining the associated monitoring occasions of the PDCCH according to the indication information, includes:

in a case that the specific monitoring mode is a per span monitoring mode, determining that a repeated transmission mode of the PDCCH is inter-span repeated transmission based on the indication information; or, in a case that the indication information further includes that the repeated transmission mode of the PDCCH is inter-span repeated transmission, determining that the associated monitoring occasions are among different spans.

In the embodiments of the present application, the terminal device can determine the associated monitoring occasions among different spans, thereby reducing the number of times of blind combination performed by the terminal device, and improving the transmission reliability of the PDCCH. In addition, the network device side can also instruct the terminal device to determine the associated monitoring occasions according to the intra-span repeated transmission by an explicit notification, so as to flexibly schedule the inter-span repeated transmission and other repeated transmissions.

In some possible embodiments, for the inter-span repeated transmission mode, two spans satisfying a first predefined relationship are associated spans;

where for the associated spans, any of following cases is included:

case 1: determining that in the associated spans, a monitoring occasion in the first search space set in any span and a monitoring occasion in the second search space set in another span are the associated monitoring occasions; and case 2: determining that in the associated spans, a monitoring occasion in the first search space set in any span and a monitoring occasion in the first search space set in another span are the associated monitoring occasions.

In the embodiments of the present application, a specific association mode of monitoring occasions among different spans is given, thereby effectively reducing the number of times of blind combination and improving the reliability of PDCCH transmission.

In some possible embodiments, the method further includes:

in a case that an unassociated span exists, determining that monitoring occasions in the unassociated span are all unassociated monitoring occasions, or determining that a repeated transmission mode of the PDCCH in the unassociated span is intra-slot repeated transmission.

In the embodiments of the present application, there is a clear understanding of the monitoring occasions in the unassociated span, which can help the terminal to effectively reduce the number of times of blind combination and improve the reliability of PDCCH transmission.

In some possible embodiments, the determining the associated monitoring occasions of the PDCCH according to the indication information, includes:

in a case that the specific monitoring mode is a per slot monitoring mode and the indication information further includes configuration information that a repeated transmission mode of the PDCCH is inter-slot repeated transmission, determining that the associated monitoring occasions are in different slots.

In the embodiments of the present application, the terminal device can determine the associated monitoring occasions from different slots, thereby effectively reducing the number of times of blind combination.

In some possible embodiments, for the inter-slot repeated transmission mode, two slots satisfying a second predefined relationship are associated slots;

where for the associated slots, any of following cases is included:

case 1: in the associated slots, a monitoring occasion in the first search space set in any slot and a monitoring occasion in the second search space set in another slot are the associated monitoring occasions; and case 2: in the associated slots, a monitoring occasion in the first search space set in any slot and a monitoring occasion in the first search space set in another slot are the associated monitoring occasions.

In the embodiments of the present application, a specific association mode of monitoring occasions among different slots is given, thereby effectively reducing the number of times of blind combination and improving the reliability of PDCCH transmission.

In some possible embodiments, the method further includes:

in a case that an unassociated slot exists, determining that monitoring occasions in the unassociated slot are all unassociated monitoring occasions, or determining that a repeated transmission mode of the PDCCH in the unassociated slot is intra-slot repeated transmission.

In the embodiments of the present application, the monitoring occasions in the unassociated slot are defined, thereby effectively reducing the number of times of blind combination and improving the reliability of PDCCH transmission.

In some possible embodiments, the determining the associated monitoring occasions of the PDCCH according to the indication information, includes:

in a case that the specific monitoring mode is a per slot monitoring mode, determining that a repeated transmission mode of the PDCCH is intra-slot repeated transmission based on the indication information; or in a case that the specific monitoring mode is a per span monitoring mode, determining that a repeated transmission mode of the PDCCH is intra-slot repeated transmission based on the indication information; or in a case that the specific monitoring mode is a per span monitoring mode and the indication information further includes configuration information of the intra-slot repeated transmission, determining that a repeated transmission mode of the PDCCH is intra-slot repeated transmission.

In the embodiments of the present application, the associated monitoring occasions are determined to be in the same slot, thereby effectively reducing the number of times of blind combination performed by the terminal device, and improving the reliability of PDCCH transmission.

In some possible embodiments, for the intra-slot repeated transmission mode, in a case that the first search space set and the second search space set in the same slot have the same number of monitoring occasions, monitoring occasions of the first search space set within the slot and monitoring occasions of the second search space set within the slot are the associated monitoring occasions.

In the embodiments of the present application, the associated monitoring occasions can be determined in a simple manner within the same slot, consuming fewer terminal resources and reducing the complexity.

In some possible embodiments, in a case that the number of monitoring occasions in the first search space set is not equal to the number of monitoring occasions in the second search space set within the same slot, any of the following cases is included:

case 1: the first monitoring occasion in the slot and the second monitoring occasion in the slot are the associated monitoring occasions;

case 2: monitoring occasions of the first search space set and the second search space set are all unassociated monitoring occasions; and case 3: monitoring occasions in the first search space set in the slot are all unassociated monitoring occasions, and the $n^{th}$ monitoring occasion and the $m^{th}$ monitoring occasion in the second search space set in the slot are associated monitoring occasions, where n and m satisfy a predefined relationship, and both m and n are positive integers.

In the embodiments of the present application, the case of repeated transmission in the same slot is provided, and a solution of how to understand which monitoring occasions are associated monitoring occasions is provided, thereby reducing the number of times of blind combination on the terminal device side and improving the success rate of PDCCH transmission.

In some possible embodiments, one span or one slot is one monitoring unit, and the detecting the PDCCH according to the associated monitoring occasions, includes:

for each monitoring unit, determining complexity of one candidate detection unit in the associated monitoring occasions as first complexity, and determining complexity of one candidate detection unit of any unassociated monitoring occasion as second complexity; where the candidate detection unit is a single PDCCH candidate or a PDCCH candidate pair; and determining, based on a monitoring capability of the terminal device in the monitoring unit, a candidate detection unit from candidate detection units in the monitoring unit for detection.

In the embodiments of the present application, the candidate detection units can be screened for detection based on the associated monitoring occasions.

In some possible embodiments, a partial candidate detection unit in two associated monitoring occasions in the monitoring unit belongs to the monitoring unit, and partial complexity in the first complexity belongs to the monitoring unit.

In the embodiments of the present application, the candidate detection unit is divided into the corresponding monitoring units in a simple manner, thereby accurately ensuring that the processing complexity of the terminal in each monitoring unit does not exceed the capability of the terminal.

In some possible embodiments, the partial candidate detection unit is a candidate detection unit, which is within the monitoring unit, in the two associated monitoring occasions in the monitoring unit.

In the embodiments of the present application, a clear scheme is given for the definition of the complexity of the candidate monitoring unit in each monitoring unit, thereby calculating the complexity in a simple manner, occupying fewer terminal resources, and reducing the power consumption.

In some possible embodiments, a complexity division mode of the partial complexity includes at least one of the following:

complexity of a partial candidate detection unit in one candidate detection unit in the associated monitoring occasions is third complexity, and a sum of third complexities of all partial candidate detection units in the one candidate detection unit is the first complexity; or, in a case that the network device side configures independent decoding, the complexity of the partial candidate detection unit of the monitoring unit is half of the first complexity; or, the complexity of the partial candidate detection unit of the monitoring unit is the second complexity; or, in a case that the network device side configures joint decoding, the complexity of the partial candidate detection unit of the monitoring unit is the third complexity, and a sum of third complexities of all partial candidate detection units in one candidate detection unit is the first complexity.

In the embodiments of the present application, a clear scheme is further given for the definition of the complexity of the candidate monitoring unit in each monitoring unit, thereby calculating the complexity in a simple manner, occupying fewer terminal resources, and reducing the power consumption.

In some possible embodiments, the method further includes:

for a case of repeated transmission between different monitoring units, performing independent decoding on the PDCCH in a case that the network device side indicates to perform joint decoding on the PDCCH.

In the embodiments of the present application, it can be guaranteed that the decoding complexity of each monitoring unit does not exceed the capability of the terminal device.

In a second aspect, an embodiment of the present application provides a detection method for a physical downlink control channel, applied to the network device side, and including:

sending indication information of a PDCCH to a terminal device, where the indication information at least includes an association relationship between search space sets and a specific monitoring mode.

In the embodiment of the present application, through the indication information, the terminal device can determine the associated monitoring occasions for the same PDCCH, thereby effectively reducing the number of times of blind combination of the terminal device.

In some possible embodiments, in a case that the specific monitoring mode is a per span monitoring mode, the indication information further includes configuration information of intra-span repeated transmission.

In the embodiments of the present application, through the configuration information of intra-span repeated transmission, the terminal device may determine that the associated monitoring occasions for the same PDCCH are located in the same span, thereby effectively reducing the number of times of blind combination of the terminal device.

In some possible embodiments, in a case that the specific monitoring mode is a per slot monitoring mode, the indication information further includes configuration information that a repeated transmission mode of the PDCCH is inter-slot repeated transmission.

In the embodiments of the present application, through the configuration information of inter-slot repeated transmission, the terminal device may determine that the associated monitoring occasions for the same PDCCH are located among slots, thereby effectively reducing the number of times of blind combination of the terminal device.

In some possible embodiments, in a case that the specific monitoring mode is a per span monitoring mode, the indication information further includes configuration information of intra-slot repeated transmission.

In the embodiments of the present application, through the configuration information of inter-slot repeated transmission, the terminal device may determine that the associated monitoring occasions for the same PDCCH are located in the same slot, thereby effectively reducing the number of times of blind combination of the terminal device.

In a third aspect, an embodiment of the present application provides a terminal device, including a processor, a memory and a transceiver; where:

the memory is configured to store a computer program;

the transceiver is configured to receive and send data under control of the processor; and the processor is configured to read the computer program in the memory and perform:

receiving indication information of a PDCCH sent by a network device side, where the indication information at least includes an association relationship between search space sets and a specific monitoring mode;

determining associated monitoring occasions of the PDCCH according to the indication information; and detecting the PDCCH according to the associated monitoring occasions.

In some possible embodiments, search space sets with an association relationship include a first search space set and a second search space set.

In some possible embodiments, when determining the associated monitoring occasions of the PDCCH according to the indication information, the processor is configured to: in a case that the specific monitoring mode is a per span monitoring mode, determine that an association mode of the monitoring occasions is associating a monitoring occasion of the first search space set with a monitoring occasion of the second search space set based on the indication information.

In some possible embodiments, when determining the associated monitoring occasions of the PDCCH according to the indication information, the processor is configured to:

in a case that the specific monitoring mode is a per span monitoring mode, determine that a repeated transmission mode of the PDCCH is intra-span repeated transmission based on the indication information; or, in a case that the indication information further includes configuration information of intra-span repeated transmission, determine that the repeated transmission mode of the PDCCH is intra-span repeated transmission;

where the associated monitoring occasions are within the same span.

In some possible embodiments, for the intra-span repeated transmission mode, in a case that the first search space set and the second search space set in the same span have the same number of monitoring occasions, monitoring occasions of the first search space set within the span and monitoring occasions of the second search space set within the span are the associated monitoring occasions.

In some possible embodiments, in a case that the number of monitoring occasions in the first search space set is not equal to the number of monitoring occasions in the second search space set within the same span, any of the following cases is included:

case 1: a monitoring occasion of the first search space set in the span and a monitoring occasion of the second search space set in the span are the associated monitoring occasions;

case 2: monitoring occasions of the first search space set and the second search space set are all unassociated monitoring occasions; and case 3: monitoring occasions in the first search space set in the span are all unassociated monitoring occasions, and the $n^{th}$ monitoring occasion and the $m^{th}$ monitoring occasion in the second search space set in the span are associated monitoring occasions, where n and m satisfy a predefined relationship, and both m and n are positive integers.

In some possible embodiments, when determining the associated monitoring occasions of the PDCCH according to the indication information, the processor is configured to:

in a case that the specific monitoring mode is a per span monitoring mode, determine that a repeated transmission mode of the PDCCH is inter-span repeated transmission based on the indication information; or, in a case that the indication information further includes that the repeated transmission mode of the PDCCH is inter-span repeated transmission, determine that the associated monitoring occasions are among different spans.

In some possible embodiments, for the inter-span repeated transmission mode, two spans satisfying a first predefined relationship are associated spans;

where for the associated spans, any of following cases is included:

case 1: determining that in the associated spans, a monitoring occasion in the first search space set in any span and a monitoring occasion in the second search space set in another span are the associated monitoring occasions; and case 2: determining that in the associated spans, a monitoring occasion in the first search space set in any span and a monitoring occasion in the first search space set in another span are the associated monitoring occasions.

In some possible embodiments, the processor is further configured to:

in a case that an unassociated span exists, determine that monitoring occasions in the unassociated span are all unassociated monitoring occasions, or determine that a repeated transmission mode of the PDCCH in the unassociated span is intra-slot repeated transmission.

In some possible embodiments, when determining the associated monitoring occasions of the PDCCH according to the indication information, the processor is configured to:

in a case that the specific monitoring mode is a per slot monitoring mode and the indication information further includes configuration information that a repeated transmission mode of the PDCCH is inter-slot repeated transmission, determine that the associated monitoring occasions are in different slots.

In some possible embodiments, for the inter-slot repeated transmission mode, two slots satisfying a second predefined relationship are associated slots;

where for the associated slots, any of following cases is included:

case 1: in the associated slots, a monitoring occasion in the first search space set in any slot and a monitoring occasion in the second search space set in another slot are the associated monitoring occasions; and case 2: in the associated slots, a monitoring occasion in the first search space set in any slot and a monitoring occasion in the first search space set in another slot are the associated monitoring occasions.

In some possible embodiments, the processor is further configured to:

in a case that an unassociated slot exists, determine that monitoring occasions in the unassociated slot are all unassociated monitoring occasions, or determine that a repeated transmission mode of the PDCCH in the unassociated slot is intra-slot repeated transmission.

In some possible embodiments, when determining the associated monitoring occasions of the PDCCH according to the indication information, the processor is configured to:

in a case that the specific monitoring mode is a per slot monitoring mode, determine that a repeated transmission mode of the PDCCH is intra-slot repeated transmission based on the indication information; or in a case that the specific monitoring mode is a per span monitoring mode, determine that a repeated transmission mode of the PDCCH is intra-slot repeated transmission based on the indication information; or in a case that the specific monitoring mode is a per span monitoring mode and the indication information further includes configuration information of the intra-slot repeated transmission, determine that a repeated transmission mode of the PDCCH is the intra-slot repeated transmission.

In some possible embodiments, for the intra-slot repeated transmission mode, in a case that the first search space set and the second search space set in the same slot have the same number of monitoring occasions, monitoring occasions of the first search space set within the slot and monitoring occasions of the second search space set within the slot are the associated monitoring occasions.

In some possible embodiments, in a case that the number of monitoring occasions in the first search space set is not equal to the number of monitoring occasions in the second search space set within the same slot, any of the following cases is included:

case 1: the first monitoring occasion in the slot and the second monitoring occasion in the slot are the associated monitoring occasions;

case 2: monitoring occasions of the first search space set and the second search space set are all unassociated monitoring occasions; and case 3: monitoring occasions in the first search space set in the slot are all unassociated monitoring occasions, and the $n^{th}$ monitoring occasion and the $m^{th}$ monitoring occasion in the second search space set in the slot are associated monitoring occasions, where n and m satisfy a predefined relationship, and both m and n are positive integers.

In some possible embodiments, one span or one slot is one monitoring unit, and when detecting the PDCCH according to the associated monitoring occasions, the processor is configured to:

for each monitoring unit, determine complexity of one candidate detection unit in the associated monitoring occasions as first complexity, and determine complexity of one candidate detection unit of any unassociated monitoring occasion as second complexity; where the candidate detection unit is a single PDCCH candidate or a PDCCH candidate pair; and determine, based on a monitoring capability of the terminal device in the monitoring unit, a candidate detection unit from candidate detection units in the monitoring unit for detection.

In some possible embodiments, a partial candidate detection unit in two associated monitoring occasions in the monitoring unit belongs to the monitoring unit, and partial complexity in the first complexity belongs to the monitoring unit.

In some possible embodiments, the partial candidate detection unit is a candidate detection unit, which is within the monitoring unit, in the two associated monitoring occasions in the monitoring unit.

In some possible embodiments, a complexity division mode of the partial complexity includes at least one of the following:

complexity of a partial candidate detection unit in one candidate detection unit in the associated monitoring occasions is third complexity, and a sum of third complexities of all partial candidate detection units in the one candidate detection unit is the first complexity; or, in a case that the network device side configures independent decoding, the complexity of the partial candidate detection unit of the monitoring unit is half of the first complexity; or, the complexity of the partial candidate detection unit of the monitoring unit is half of the first complexity; or, the complexity of the partial candidate detection unit of the monitoring unit is the second complexity; or, in a case that the network device side configures joint decoding, the complexity of the partial candidate detection unit of the monitoring unit is the third complexity, and a sum of third complexities of all partial candidate detection units in one candidate detection unit is the first complexity.

In some possible embodiments, the processor is further configured to:

for a case of repeated transmission between different monitoring units, perform independent decoding on the PDCCH in a case that the network device side indicates to perform joint decoding on the PDCCH.

In a fourth aspect, an embodiment of the present application provides a network device side, including: a processor, a memory and a transceiver; where:

the memory is configured to store a computer program;

the transceiver is configured to receive and send data under control of the processor; and the processor is configured to read the computer program in the memory and perform:

sending indication information of a PDCCH to a terminal device, where the indication information at least includes an association relationship between search space sets and a specific monitoring mode.

In some possible embodiments, in a case that the specific monitoring mode is a per span monitoring mode, the indication information further includes configuration information of intra-span repeated transmission.

In some possible embodiments, in a case that the specific monitoring mode is a per slot monitoring mode, the indication information further includes configuration information that a repeated transmission mode of the PDCCH is inter-slot repeated transmission.

In some possible embodiments, in a case that the specific monitoring mode is a per span monitoring mode, the indication information further includes configuration information of intra-slot repeated transmission.

In a fifth aspect, an embodiment of the present application provides a detection apparatus for a physical downlink control channel, applied to a terminal device, and including:

an indication information receiving device, configured to receive indication information of a PDCCH sent by a network device side, where the indication information at least includes an association relationship between search space sets and a specific monitoring mode;

a monitoring occasion determining device, configured to determine associated monitoring occasions of the PDCCH according to the indication information; and a detection device, configured to detect the PDCCH according to the associated monitoring occasions.

In some possible embodiments, search space sets with an association relationship include a first search space set and a second search space set.

In some possible embodiments, when determining the associated monitoring occasions of the PDCCH according to the indication information, the monitoring occasion determining device is configured to:

in a case that the specific monitoring mode is a per span monitoring mode, determine that an association mode of the monitoring occasions is associating a monitoring occasion of the first search space set with a monitoring occasion of the second search space set based on the indication information.

In some possible embodiments, when determining the associated monitoring occasions of the PDCCH according to the indication information, the monitoring occasion determining device is configured to:

in a case that the specific monitoring mode is a per span monitoring mode, determine that a repeated transmission mode of the PDCCH is intra-span repeated transmission based on the indication information; or, in a case that the indication information further includes configuration information of intra-span repeated transmission, determine that the repeated transmission mode of the PDCCH is intra-span repeated transmission;

where the associated monitoring occasions are within a same span.

In some possible embodiments, for the intra-span repeated transmission mode, in a case that the first search space set and the second search space set in the same span have the same number of monitoring occasions, monitoring occasions of the first search space set within the span and monitoring occasions of the second search space set within the span are the associated monitoring occasions.

In some possible embodiments, in a case that the number of monitoring occasions in the first search space set is not equal to the number of monitoring occasions in the second search space set within the same span, any of the following cases is included:

case 1: a monitoring occasion of the first search space set in the span and a monitoring occasion of the second search space set in the span are the associated monitoring occasions;

case 2: monitoring occasions of the first search space set and the second search space set are all unassociated monitoring occasions; and case 3: monitoring occasions in the first search space set in the span are all unassociated monitoring occasions, and the $n^{th}$ monitoring occasion and the $m^{th}$ monitoring occasion in the second search space set in the span are associated monitoring occasions, where n and m satisfy a predefined relationship, and both m and n are positive integers.

In some possible embodiments, when determining the associated monitoring occasions of the PDCCH according to the indication information, the monitoring occasion determining device is configured to:

in a case that the specific monitoring mode is a per span monitoring mode, determine that a repeated transmission mode of the PDCCH is inter-span repeated transmission based on the indication information; or, in a case that the indication information further includes that the repeated transmission mode of the PDCCH is inter-span repeated transmission, determine that the associated monitoring occasions are among different spans.

In some possible embodiments, for the inter-span repeated transmission mode, two spans satisfying a first predefined relationship are associated spans;

where for the associated spans, any of following cases is included:

case 1: determining that in the associated spans, a monitoring occasion in the first search space set in any span and a monitoring occasion in the second search space set in another span are the associated monitoring occasions; and case 2: determining that in the associated spans, a monitoring occasion in the first search space set in any span and a monitoring occasion in the first search space set in another span are the associated monitoring occasions.

In some possible embodiments, the monitoring occasion determining device is further configured to:

in a case that an unassociated span exists, determine that monitoring occasions in the unassociated span are all unassociated monitoring occasions, or determine that a repeated transmission mode of the PDCCH in the unassociated span is intra-slot repeated transmission.

In some possible embodiments, when determining the associated monitoring occasions of the PDCCH according to the indication information, the monitoring occasion determining device is configured to:

in a case that the specific monitoring mode is a per slot monitoring mode and the indication information further includes configuration information that a repeated transmission mode of the PDCCH is inter-slot repeated transmission, determine that the associated monitoring occasions are in different slots.

In some possible embodiments, for the inter-slot repeated transmission mode, two slots satisfying a second predefined relationship are associated slots;

where for the associated slots, any of following cases is included:

case 1: in the associated slots, a monitoring occasion in the first search space set in any slot and a monitoring occasion in the second search space set in another slot are the associated monitoring occasions; and case 2: in the associated slots, a monitoring occasion in the first search space set in any slot and a monitoring occasion in the first search space set in another slot are the associated monitoring occasions.

In some possible embodiments, the monitoring occasion determining device is further configured to:

in a case that an unassociated slot exists, determine that monitoring occasions in the unassociated slot are all unassociated monitoring occasions, or determine that a repeated transmission mode of the PDCCH in the unassociated slot is intra-slot repeated transmission.

In some possible embodiments, when determining the associated monitoring occasions of the PDCCH according to the indication information, the monitoring occasion determining device is configured to:

in a case that the specific monitoring mode is a per slot monitoring mode, determine that a repeated transmission mode of the PDCCH is intra-slot repeated transmission based on the indication information; or in a case that the specific monitoring mode is a per span monitoring mode, determine that a repeated transmission mode of the PDCCH is intra-slot repeated transmission based on the indication information; or in a case that the specific monitoring mode is a per span monitoring mode and the indication information further includes configuration information of the intra-slot repeated transmission, then determine that a repeated transmission mode of the PDCCH is intra-slot repeated transmission.

In some possible embodiments, for the intra-slot repeated transmission mode, in a case that the first search space set and the second search space set in a same slot have the same number of monitoring occasions, monitoring occasions of the first search space set within the slot and monitoring occasions of the second search space set within the slot are the associated monitoring occasions.

In some possible embodiments, in a case that the number of monitoring occasions in the first search space set is not equal to the number of monitoring occasions in the second search space set within the same slot, any of the following cases is included:

case 1: the first monitoring occasion in the slot and the second monitoring occasion in the slot are the associated monitoring occasions;

case 2: monitoring occasions of the first search space set and the second search space set are all unassociated monitoring occasions; and case 3: monitoring occasions in the first search space set in the slot are all unassociated monitoring occasions, and the $n^{th}$ monitoring occasion and the $m^{th}$ monitoring occasion in the second search space set in the slot are associated monitoring occasions, where n and m satisfy a predefined relationship, and both m and n are positive integers.

In some possible embodiments, one span or one slot is one monitoring unit, and when detecting the PDCCH according to the associated monitoring occasions, the monitoring occasion determining device is configured to:

for each monitoring unit, determine complexity of one candidate detection unit in the associated monitoring occasions as first complexity, and determine complexity of one candidate detection unit of any unassociated monitoring occasion as second complexity; where the candidate detection unit is a single PDCCH candidate or a PDCCH candidate pair; and determine, based on a monitoring capability of the terminal device in the monitoring unit, a candidate detection unit from candidate detection units in the monitoring unit for detection.

In some possible embodiments, a partial candidate detection unit in two associated monitoring occasions in the monitoring unit belongs to the monitoring unit, and partial complexity in the first complexity belongs to the monitoring unit.

In some possible embodiments, the partial candidate detection unit is a candidate detection unit, which is within the monitoring unit, in the two associated monitoring occasions in the monitoring unit.

In some possible embodiments, a complexity division mode of the partial complexity includes at least one of the following:

complexity of a partial candidate detection unit in one candidate detection unit in the associated monitoring occasions is third complexity, and a sum of third complexities of all partial candidate detection units in the one candidate detection unit is the first complexity; or, in a case that the network device side configures independent decoding, the complexity of the partial candidate detection unit of the monitoring unit is half of the first complexity; or, the complexity of the partial candidate detection unit of the monitoring unit is half of the first complexity; or, the complexity of the partial candidate detection unit of the monitoring unit is the second complexity; or, in a case that the network device side configures joint decoding, the complexity of the partial candidate detection unit of the monitoring unit is the third complexity, and a sum of third complexities of all partial candidate detection units in one candidate detection unit is the first complexity.

In some possible embodiments, the monitoring occasion determining device is further configured to:

for a case of repeated transmission between different monitoring units, perform independent decoding on the PDCCH in a case that the network device side indicates to perform joint decoding on the PDCCH.

In a sixth aspect, an embodiment of the present application provides a detection apparatus for a physical downlink control channel, applied to the network device side and including:

an indication information sending device, configured to send indication information of a PDCCH to a terminal device, where the indication information at least includes an association relationship between search space sets and a specific monitoring mode.

In some possible embodiments, in a case that the specific monitoring mode is a per span monitoring mode, the indication information further includes configuration information of intra-span repeated transmission.

In some possible embodiments, in a case that the specific monitoring mode is a per slot monitoring mode, the indication information further includes configuration information that a repeated transmission mode of the PDCCH is inter-slot repeated transmission.

In some possible embodiments, in a case that the specific monitoring mode is a per span monitoring mode, the indication information further includes configuration information of intra-slot repeated transmission.

In a seventh aspect, an embodiment of the present application further provides a computer storage medium storing a computer program, where the computer program is configured to cause a computer to perform the method described in any one of the first aspect and the second aspect.

In an eighth aspect, an embodiment of the present application further provides a computer program product including program codes, where the computer program product, when running on the electronic device, causes the electronic device to perform the method described in any one of the first aspect and the second aspect.

Furthermore, the effects brought about by any implementation in the first to eighth aspects can refer to the effects brought about by different implementations in the first and second aspects, and will not be repeated here. These aspects and other aspects of the present application will be more clear and easy to understand in the description of the following embodiments.

BRIEF DESCRIPTION OF FIGURES

In order to illustrate the embodiments of the present application more clearly, the accompanying figures which need to be used in describing the embodiments will be introduced below briefly. The accompanying figures described below are only some embodiments of the present application.

FIG. 2C is a schematic diagram of a hybrid transmission according to embodiments of the present application.

FIG. 3 is an overall flowchart of detecting a PDCCH according to embodiments of the present application.

FIG. 4 is a schematic structural diagram of a terminal device according to embodiments of the present application.

DETAILED DESCRIPTION

Figure 1:
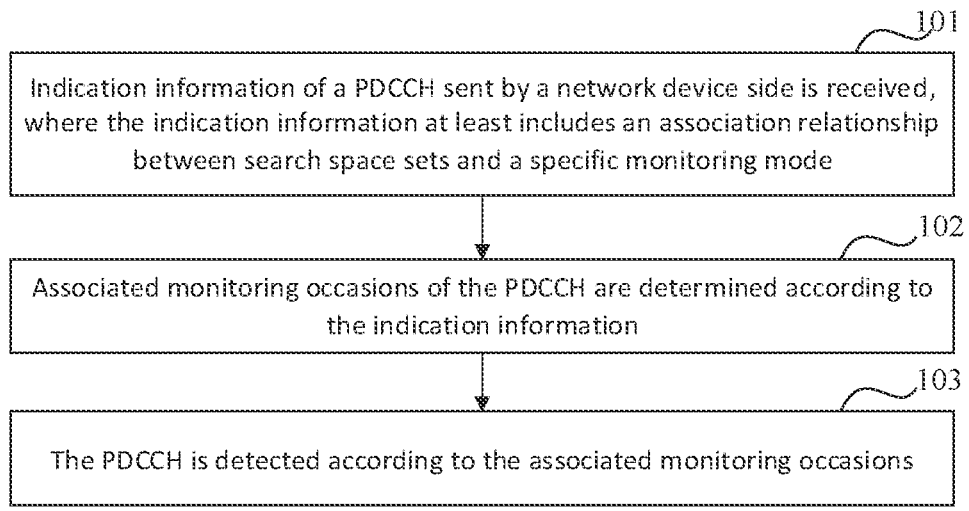
FIG. 1 is an overall flowchart of a detection method for a PDCCH according to embodiments of the present application.

In the following, some terms in the embodiments of the present application are explained so as to facilitate the understanding of the embodiments of the disclosure.

(1) In the embodiments of the present application, the nouns "network" and "system" are often used alternately.

(2) The term "a plurality of" in the embodiments of the present application refers to two or more, and other quantifiers are similar thereto.

(3) "and/or" describes the association relationship of the associated objects, and indicates that there may be three relationships, for example, A and/or B may represent: only A, both A and B, and only B. The character "/" generally indicates that the associated objects have a "or" relationship.

(4) "Monitoring unit": the monitoring modes for downlink PDCCH in the embodiments of the present application may include a per span monitoring mode and a per slot monitoring mode. For the convenience of description in some places, the "monitoring unit" may refer to a span (duration) or a slot in the present application.

(5) "Candidate detection unit": another definition of a PDCCH candidate in the embodiments of the present application, where the "candidate detection unit" is used to measure a candidate detected object. For example, a candidate detection unit may be a PDCCH or a PDCCH pair. Of course, in actual applications, the measurement mode of the "candidate detection unit" may also be determined according to actual requirements, which are applicable to the embodiments of the present application.

(6) "Complexity": in the embodiments of the present application, "complexity" is used to measure the monitoring capability of the terminal device, and complexity is also used to measure the candidate detection unit or the number of candidate detection units, to facilitate the terminal device to screen for detected candidate detection units according to its own capability.

(7) Based on monitoring occasion (MO), the present application proposes "associated monitoring occasion", which may also be referred to as the "associated MO" in some places. The "associated MO" is used for repeated transmission of the same PDCCH.

(8) Based on span, "associated span" is proposed in the embodiments of the present application, and the "associated span" is used for repeated transmission of the same PDCCH.

(9) Based on the Slot, "associated slot" is proposed in the embodiments of the present application, and may also be referred to as "associated Slot" in some places; and the "associated Slot" is used for repeated transmission of the same PDCCH.

The embodiments of the present application may be applicable to various systems, especially a 5G system. For example, the applicable systems may be: a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a LTE Frequency Division Duplex (FDD) system, a LTE Time Division Duplex (TDD) system, a Long Term Evolution Advanced (LTE-A) system, a Universal Mobile Telecommunication System (UMTS), a Worldwide interoperability for Microwave Access (WiMAX) system, a 5G New Radio (NR) system, etc. These systems all include terminal devices and network device sides. A core network part may also be included in the system, such as an Evloved Packet System (EPS), a 5G System (5GS), etc.

The terminal device involved in the embodiments of the present application may be a device for providing the voice and/or data connectivity to the user, a handheld device with the wireless connection function, or other processing devices connected to the wireless modem, etc. In different systems, the terminal device may have different names. For example, in a 5G system, the terminal device may be called User Equipment (UE). The wireless terminal device may communicate with one or more Core Networks (CNs) via the Radio Access Network (RAN), and the wireless terminal device may be a mobile terminal, such as a mobile telephone (or called "cellular" telephone), and a computer with the mobile terminal, for example, may be a portable, pocket, handheld, computer built-in or vehicle-carried mobile device, which exchange the voice and/or data with the radio access network. For example, the wireless terminal device may be a Personal Communication Service (PCS) telephone, a cordless telephone, a Session Initiation Protocol (SIP) telephone, a Wireless Local Loop (WLL) station, a Personal Digital Assistant (PDA) and other devices. The wireless terminal device can also be called a system, a subscriber device, a subscriber station, a mobile station, mobile, a remote station, an access point, a remote terminal, an access terminal, a user terminal, a user agent, and a user device, which is not limited in the embodiments of the present application.

The network device side involved in the embodiments of the present application may be a core network and/or a base station, and the base station may include a plurality of cells providing services for terminals. Depending on specific application scenarios, the base station may also be called access point, or may be a device in the access network communicating with the wireless terminal via one or more sectors over the air interface, or may also be called other names. The network device side may be used to exchange the received air frame with the Internet Protocol (IP) packet, and used as the router between the wireless terminal device and the rest of the access network, where the rest of the access network may include IP communication networks. The network device side may further coordinate the attribute management of the air interface. For example, the network device side involved in the embodiments of the present application can be a network device side (Base Transceiver Station (BTS)) in the GSM or CDMA, or can be a network device side (NodeB) in the WCDMA, or can be an evolutional network device side (evolutional Node B (eNB or e-NodeB)) in the LTE system, a 5G base station (gNB) in the 5G network architecture (next generation system), or can be a Home evolved Node B (HeNB), a relay node, femto, pico, etc., which is not limited in the embodiments of the present application. In some network structures, the network device side may include a Centralized Unit (CU) node and a Distributed Unit (DU) node, and the centralized unit and the distributed unit may also be geographically separated.

The network architectures and service scenarios described in the embodiments of the present application are intended to illustrate the technical solutions of the embodiments of the present application more clearly, and do not constitute a limitation provided in the embodiments of the present application. With the evolution of network architectures and the emergence of new service scenarios, the embodiments of the present application are also applicable to similar problems.

In order to make the embodiments of the present application clearer, the present application will be further illustrated below in details with reference to the accompanying figures. The described embodiments are merely a part of the embodiments of the present application but not all the embodiments.

First of all, for ease of understanding, the cases of related technologies will be analyzed and illustrated below. It should be understood that the analysis of related technologies below also belongs to a part of the embodiments of the present application.

In the related technologies, the NR defines a PDCCH candidate as a candidate resource occupied by the PDCCH during transmission. Usually, when the PDCCH is transmitted on the PDCCH candidate, the network device side may configure a certain number of PDCCH candidates for the terminal device, to increase the scheduling flexibility of the network device side (such as a base station). However, the number of PDCCH candidates sent by the network device side to the terminal device may be greater than the blind detection capability of the terminal device. Here, when detecting the PDCCH, the terminal device side may determine the detected PDCCH candidate according to the index values of search space sets where the PDCCH candidates are located in ascending order. Specifically, the maximum number of PDCCH candidates that the terminal device can detect under the SubCarrier Spacing (SCS) configuration in one monitoring unit (such as one slot, one span) is fixed, and the PDCCH candidates exceeding the upper limit of the number will not be detected by the terminal. If the PDCCH is transmitted in the undetected PDCCH candidate, the PDCCH transmission may fail.

The maximum number of PDCCH candidates that the terminal device can monitor under different subcarrier spacing configurations in one slot is as shown in Table 1.

TABLE 1

| $\mu$ | $M_{PDCCH}^{max,slot,\mu}$ |
|---|---|
| 0 | 44 |
| 1 | 36 |
| 2 | 22 |
| 3 | 20 |

Where $$M_{PDCCH}^{max,slot,\mu}$$

is the maximum number of PDCCH candidates that can be monitored PDCCH in a unit slot in one downlink bandwidth part of one serving cell; and u is the subcarrier spacing, where $\mu \in \{0, 1, 2, 3\}$.

The maximum number of PDCCH candidates that the terminal device can monitor under different subcarrier spacing configurations in one span is as shown in Table 2.

TABLE 2

| $\mu$ | $M_{PDCCH}^{max,(X,Y),\mu}$ | | |
|---|---|---|---|
| | (2, 2) | (4, 3) | (7, 3) |
| 0 | 14 | 28 | 44 |
| 1 | 12 | 24 | 36 |

Where $$M_{PDCCH}^{max,(X,Y),\mu}$$

is the maximum number of PDCCH candidates that can be monitored in one span of combination (X, Y) in one downlink bandwidth part of one serving cell; and $\mu$ is the subcarrier spacing, where $\mu \in \{0, 1\}$.

The transmission modes of the PDCCH may include single transmission and repeated transmission. In order to increase the reliability of the control information, one PDCCH can be respectively transmitted in two search space sets or one search space set in the repeated transmission mode of the PDCCH, where the search space set is a subset of the control resource set. Usually, one search space set contains a plurality of monitoring occasions, and each monitoring occasion can be used for PDCCH transmission. If the terminal device detects PDCCH candidates on any two monitoring occasions via blind detection, the number of PDCCHs that need to be detected will exceed the blind detection capability of the terminal device, thereby causing the failure of PDCCH transmission.

In order to solve the above problem, the present application proposes a PDCCH detection method and a related apparatus.

The embodiments of the present application can be summarized as follows: the network device side sends the indication information to the terminal device, where the indication information includes an association relationship between search space sets and a specific monitoring mode of the terminal device. The terminal device can determine the associated MOs for the same PDCCH based on the indication information, so that the terminal device can reduce the range of blind detection, and effectively reduce the number of times of blind combination of PDCCH candidates during joint detection and decoding of the PDCCH. The problem that the terminal device cannot detect the PDCCH within the scope of the monitoring capability is alleviated, thereby improving the success rate of PDCCH transmission.

A detection method for a physical downlink control channel according to embodiments of the present application will be described in detail below with reference to the accompanying drawings.

As shown in FIG. 1, FIG. 1 is a schematic flowchart of a detection method for a physical downlink control channel applicable to the terminal device side provided in the present application, including the following.

Step 101: indication information of a PDCCH sent by a network device side is received, where the indication information at least includes an association relationship between search space sets and a specific monitoring mode.

In the embodiments of the present application, the association relationship between search space sets is used to indicate which search space sets have the association relationship, and the search space sets with the association relationship are potential search space sets carrying the associated monitoring occasions.

In some possible embodiments, the network device side may inform the terminal device that N search space sets are associated, where NE a positive integer. During implementation, N may be 1, to indicate that the associated monitoring occasions are in the same search space set. N may be more, such as 3, to indicate that the associated monitoring occasions of the same PDCCH are in three associated search space sets. When N is 3, the network device side may further instruct the terminal that two search space sets are associated during actual transmission through dynamic signaling. N may be 2, to indicate that the associated monitoring occasions of the same PDCCH are in two associated search space sets.

During implementation, each PDCCH corresponds to the associated first and second search space sets.

During implementation, the first search space set and the second search space set may be different or the same. When they are the same, it means that Nis 1, that is, the PDCCH is transmitted at the monitoring occasion in the first search space set in this case. During implementation, an index value of the first search space set may be less than an index value of the second search space set. Of course, the index value of the first search space set may also be greater than the index value of the second search space set, as long as different search space sets can be distinguished to avoid ambiguity, which is not limited in the embodiments of the present application. It should be understood that the first search space set and the second search space set may be in the same control resource set, meaning that the PDCCH is repeatedly transmitted twice by one transmission and receiving point (TRP) (multi-TRPs); or the first search space set and the second search space set may not be in the same control resource set, meaning that the PDCCH is repeatedly transmitted twice by two TRPs, which is not limited in the present application.

Based on the association relationship between the first search space set and the second search space set, it is helpful for the terminal device to determine the associated monitoring occasions in the first search space set and the second search space set, reducing the processing complexity of the terminal device.

In addition, the above specific monitoring mode is the monitoring mode of the terminal device for the PDCCH, specifically including a per span monitoring mode and a per slot monitoring mode.

The monitoring mode of the terminal device and the association relationship between search space sets are indicated by the network device side to the terminal device. After receiving the indication information sent by the network device side, the terminal device performs step 102 that: associated monitoring occasions of the PDCCH are determined according to the indication information.

Then, in step 103, the PDCCH is detected according to the associated monitoring occasions.

Therefore, in the embodiment of the present application, the terminal device can determine the monitoring occasions of the same PDCCH, thus reducing the range of blind detection, effectively reducing the number of times of blind combination of PDCCH candidates during PDCCH joint detection and decoding, thereby improving the possibility of detecting the PDCCH candidate that transmits the PDCCH, and alleviating the problem of failure of PDCCH transmission.

The monitoring modes supported by the terminal device may include a per span monitoring mode and a per slot monitoring mode. The repeated transmission modes of the PDCCH may be divided into repeated transmission within the same span, repeated transmission within the same slot, repeated transmission among different spans, and repeated transmission among different slots; and the repeated transmission within the same slot may also be divided into repeated transmission within the same span and repeated transmission among different spans, and a hybrid transmission mode (that is, including repeated transmissions within the same span and repeated transmissions among different spans) may also exist in the same slot. Therefore, the association relationship of MOs may be configured in multiple ways under different monitoring modes and different repeated transmission modes. Thus, the present application provides multiple feasible solutions to determine the associated MOs.

For ease of understanding, the implementable modes under different indication information contents will be respectively illustrated below.

Part 1: per span monitoring mode.

In the present application, a variety of solutions can be provided for the per span monitoring mode described in the part 1, including the following.

Solution 1: the indication information includes: the per span monitoring mode+associated search space sets (hereinafter referred to as indication information 1).

In the case of the indication information 1, the association modes of monitoring occasions may include association modes 1.1-1.4 as follows.

Association mode 1.1: intra-span repeated transmission.

That is, based on the above indication information 1, the terminal device may determine that the repeated transmission mode of the PDCCH is intra-span repeated transmission, so it is understood that the associated monitoring occasions are within the same span. Thus, the terminal device can determine the associated monitoring occasions within the same span, to effectively reduce the number of times of blind combination.

During implementation, the association rule can be set according to actual requirements for the association of those monitoring occasions within the same span.

Since the number of monitoring occasions in the first search space set and the second search space set in the same span may be the same or different, the embodiments of the present application may provide different solutions to determine the associated monitoring occasions according to the number of monitoring occasions in different search space sets in the same span.

In a possible implementation 1.1.1, the number of monitoring occasions of the first search space set is equal to the number of monitoring occasions of the second search space set.

When different search space sets have the same number of the monitoring occasions, the associated monitoring occasions within the same span are respectively from the first search space set and the second search space set. For example, within the same span, the $n^{th}$ monitoring occasion of the first search space set and the $m^{th}$ monitoring occasion of the second search space set are the associated monitoring occasions. Here, both n and m are positive integers, and n and m may be equal or different.

Figure 2A:
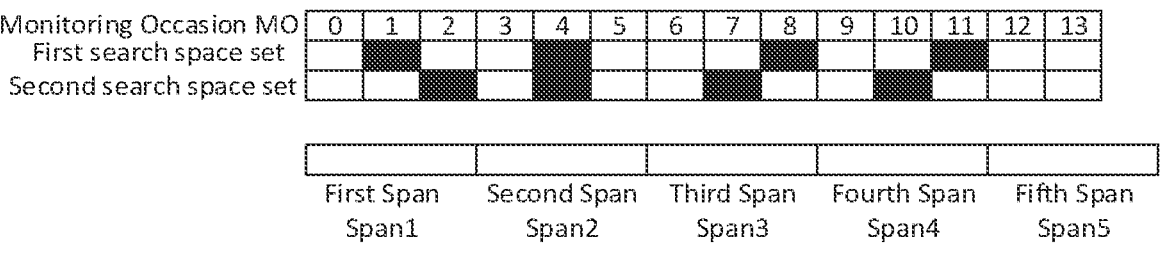
FIG. 2A is a schematic diagram of intra-span transmission according to embodiments of the present application.

When n and m are equal, FIG. 2A shows a schematic diagram of associated monitoring occasions in the case of intra-span repeated transmission. In FIG. 2A, one slot may include a plurality of spans, and the first search space set and the second search space set respectively contain a plurality of monitoring occasions respectively. Each span contains two associated monitoring occasions. As shown in FIG. 2A, the monitoring occasion 1 of the first search space set in span 1 is associated with the monitoring occasion 2 of the second search space set in span 2; in span 2, the monitoring occasion 4 of the first search space set is associated with the monitoring occasion 4 of the second search space set; in span 3, the monitoring occasion 7 of the second search space set is associated with the monitoring occasion 8 of the first search space set; and in span 4, the monitoring occasion 10 of the second search space set is associated with the monitoring occasion 11 of the first search space set.

In the implementation, the associated monitoring occasions can be determined in a simple manner within the same span, consuming fewer terminal resources and reducing the complexity.

In a possible implementation 1.1.2, the number of monitoring occasions of the first search space set is not equal to the number of monitoring occasions of the second search space set.

If the number of monitoring occasions in the first search space set is not equal to the number of monitoring occasions in the second search space set within the same span, the associated monitoring occasions include any of the following cases.

Case 1: monitoring occasions of the first search space set in the span and monitoring occasions of the second search space set in the span are the associated monitoring occasions.

In the implementation, the $n^{th}$ monitoring occasion of the first search space set and the $m^{th}$ monitoring occasion of the second search space set within the same span are the associated monitoring occasions. Here, both n and m are positive integers, and n and m may be equal or different.

It should be noted that, when there is an unassociated monitoring occasion (that is, this monitoring occasion is not used to transmit the same PDCCH together with other monitoring occasions) in the same span, the unassociated monitoring occasion is determined as a monitoring occasion for the single transmission.

Case 2: monitoring occasions of the first search space set and the second search space set are all unassociated monitoring occasions.

That is, the monitoring occasions of the first search space set and the second search space set are monitoring occasions for the single transmission.

Case 3: monitoring occasions in the first search space set in the span are unassociated monitoring occasions, and the $n^{th}$ and $m^{th}$ monitoring occasions in the second search space set in the span are associated monitoring occasions, where n and m satisfy a predefined relationship, and both m and n are positive integers. Here, the predefined relationship between n and m may be determined according to actual requirements, for example, two adjacent monitoring occasions are the associated monitoring occasions. For example, the monitoring occasions at an interval of one monitoring occasion are associated monitoring occasions, for example, the first and third monitoring occasions in the same search space set are associated monitoring occasions.

It should be noted that the first search space set and the second search space set in the embodiments of the present application are only used to distinguish two search space sets. When implementing the solution of the case 3, the search space set for repeated transmission of the PDCCH may be any one of the two search space sets, as long as the terminal device and the network device side transmit and detect the PDCCH according to the consistent understanding.

Therefore, in the embodiments of the present application, the case of repeated transmission in the same span is provided, and a solution of how to understand which monitoring occasions are associated monitoring occasions is provided, thereby reducing the number of times of blind combination on the terminal device side and improving the success rate of PDCCH transmission.

Association mode 1.2: inter-span repeated transmission.

In embodiments of the present application, the inter-span repeated transmission can be determined based on the above indication information 1 (that is, indicating the per span monitoring mode+associated search space sets). Thus, the terminal device can determine that the associated monitoring occasions come from different spans, thereby reducing the number of times of blind combination and improving the transmission reliability of the PDCCH.

There may be two or more spans for repeated transmission of the PDCCH, which may be determined according to actual conditions. Two spans are taken as an example for description in the following.

In the inter-span repeated transmission mode, the terminal device determines two spans satisfying a first predefined relationship as associated spans. For example, the first predefined relationship can be understood as two adjacent spans or two non-adjacent spans including the first search space set and the second search space set, which can be set according to requirements and is not limited in the present application. The two associated spans may be located in the same slot or in different slots, which is not limited in the present application.

Determining the associated monitoring occasions between associated spans may be implemented as follows.

Case 1: it is determined that in the associated spans, a monitoring occasion in the first search space set in any span and a monitoring occasion in the second search space set in another span are the associated monitoring occasions.

Figure 2B:
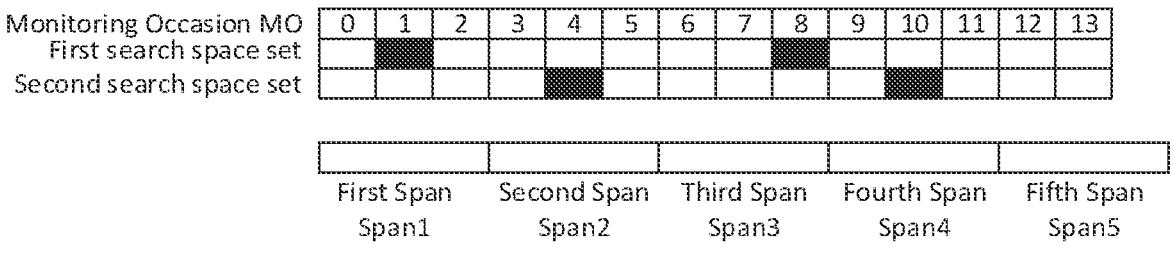
FIG. 2B is a schematic diagram of inter-span transmission according to embodiments of the present application.

As shown in FIG. 2B, one slot may include a plurality of spans, and the first search space set and the second search space set respectively include a plurality of monitoring occasions. Two associated monitoring occasions are respectively in two spans. As shown in FIG. 2B, a monitoring occasion 1 of the first search space set in span 1 is associated with a monitoring occasion 4 of the second search space set in span 2, and a monitoring occasion 8 of the first search space set in span 3 is associated with a monitoring occasions 10 of the second search space set in span 4.

It should be noted that, if there is an unassociated monitoring occasion in the associated spans, this monitoring occasion may be determined as a monitoring occasion for the single transmission.

In the case 1, the monitoring occasions in different search space sets in different spans are associated. In another possible implementation, the associated monitoring occasions in different spans may come from the same search space set. Therefore, it can be implemented as follows.

Case 2: it is determined that in the associated spans, a monitoring occasion in the first search space set in any span and a monitoring occasion in the first search space set in another span are the associated monitoring occasions.

Similar to the above, it should be noted that the first search space set and the second search space set in the embodiments of the present application are only used to distinguish two search space sets. When implementing the solution of the case 2, the search space set for repeated transmission of the PDCCH may be any one of the two search space sets, as long as the terminal device and the network device side transmit and detect the PDCCH according to the consistent understanding.

Thus, in the embodiments of the present application, a specific association mode of monitoring occasions among different spans is given, thereby effectively reducing the number of times of blind combination and improving the reliability of PDCCH transmission.

It should be noted that, if there is an unassociated span (that is, there is a span that is not used for repeated transmission of the same PDCCH together with other spans), the monitoring occasions in the unassociated span are all determined as unassociated monitoring occasions. That is, the monitoring occasions in the unassociated span are all monitoring occasions for the single transmission.

Alternatively, in another implementation, the repeated transmission mode of the PDCHH in the unassociated span is determined as intra-slot repeated transmission. The solution of intra-slot repeated transmission will be explained in solution 1 in part 2 later, and will not be illustrated here.

In the embodiment, there is a clear understanding of the monitoring occasions in the unassociated span, which can help the terminal to effectively reduce the number of times of blind combination and improve the reliability of PDCCH transmission.

Association mode 1.3: Hybrid transmission mode.

As mentioned above, the repeated transmission modes of PDCCH can be divided into many cases. Since the indication information 1 fails to carry the repeated transmission mode of the terminal device for PDCCH while each slot can contain a plurality of spans, the terminal device may also determine that there are intra-span repeated transmission and inter-span repeated transmission in the same slot during implementation. During implementation, it can be determined whether the repeated transmission is intra-span repeated transmission or inter-span repeated transmission based on the association relationship of monitoring occasions. For example, if two associated monitoring occasions are respectively within two spans, the repeated transmission is inter-span repeated transmission; and if two associated monitoring occasions are both within one span, the repeated transmission is intra-span repeated transmission. It can also be determined whether the repeated transmission is intra-span repeated transmission or inter-span repeated transmission based on the numbers of monitoring occasions in the first search space set and the second search space set within the span. For example, if the numbers are different, it can be determined that the repeated transmission of the current span is inter-span repeated transmission; if the numbers are equal, it can be determined that the repeated transmission of the current span is intra-span repeated transmission.

The hybrid transmission mode can be shown in FIG. 2C. In FIG. 2C, the same slot includes a plurality of spans, and the repeated transmission mode of the PDCCH in span 1 and span 2 is inter-span repeated transmission. Specifically, as shown in FIG. 2C, the monitoring occasion 1 of the first search space set belongs to span 1, and its associated monitoring occasion 4 of the second search space set belongs to span 2. The repeated transmission mode in span 3 and span 4 is intra-span repeated transmission. Specifically, as shown in FIG. 2C, the monitoring occasion 8 of the first search space set and the monitoring occasion 7 of the second search space set belong to span 3, and the monitoring occasion 11 of the first search space set and the monitoring occasion 10 of the second search space set belong to span 4.

In the implementation of the present application, the hybrid transmission mode can facilitate flexible scheduling of PDCCH candidates in the same slot.

Association mode 1.4: associated monitoring occasions are provided in different sets.

In the embodiment, based on the above indication, the terminal device may newly determine the association mode of monitoring occasions as: associating the monitoring occasion of the first search space set with the monitoring occasion of the second search space set.

That is, the associated monitoring occasions are located in the first search space set and the second search space set. During implementation, two MOs that have an association relationship in this association mode can be defined according to actual requirements, which is not limited in the present application. For example, the repeated transmission modes in the same slot can be defined, and as mentioned above, may include: the repeated transmission mode in the same span in the same slot for association, the repeated transmission mode among different spans in the same slot for association, and the hybrid transmission mode in the same slot for association. Of course, the associated monitoring occasions may also be determined according to the repeated transmission among different slots. No matter which way is adopted, as long as the terminal device and the network device side transmit and detect the PDCCH according to the consistent understanding.

Solution 2: the indication information includes: per span monitoring mode+associated search space sets+configuration information of intra-span repeated transmission (hereinafter referred to as indication information 2).

Based on the indication information 2, the terminal device may determine that the repeated transmission mode of the PDCCH is intra-span repeated transmission, and correspondingly, the associated monitoring occasions are located within the same span. In the implementation, the way to determine the associated occasions can refer to the implementation of the intra-span repeated transmission in 1.1 of solution 1, and will not be repeated here.

In the implementation, the network device side instructs the terminal device to determine the associated monitoring occasions according to the intra-span repeated transmission by an explicit notification, so as to flexibly schedule the intra-span repeated transmission and other repeated transmissions.

Solution 3: the indication information includes: per span monitoring mode+associated search space sets+configuration information of inter-span repeated transmission (hereinafter referred to as indication information 3).

Based on the indication information 3, the terminal device may determine that the repeated transmission mode of the PDCCH is inter-span repeated transmission, and correspondingly, the associated monitoring occasions are located within different spans. In the implementation, the way to determine the associated occasions can refer to the implementation of the inter-span repeated transmission in 1.2 of solution 1, and will not be repeated here.

In the implementation, the network device side instructs the terminal device to determine the associated monitoring occasions according to the inter-span repeated transmission by an explicit notification, so as to flexibly schedule the inter-span repeated transmission and other repeated transmissions.

The above is the ways to determine the associated monitoring occasions in the per span monitoring mode provided by the embodiments of the present application. The ways to determine the associated monitoring occasions in the per slot monitoring mode will be described below.

Part 2: per slot monitoring mode.

Solution 1: the indication information includes: per slot monitoring mode+associated search space sets (hereinafter referred to as indication information 4), or the indication information includes: per slot monitoring mode+associated search space sets+configuration information of intra-slot repeated transmission (hereinafter also referred to as indication information 4).

Based on the indication information 4, the terminal device may determine that the repeated transmission mode of the PDCCH is intra-slot repeated transmission. Therefore, the terminal device may determine that the associated monitoring occasions need to be determined within the same slot.

The associated monitoring occasions are within the same slot, which can help the terminal to effectively reduce the number of times of blind combination and improve the reliability of PDCCH transmission.

The intra-slot repeated transmission mode may be implemented by reference to the repeated transmission mode in the same span. For example, it may be implemented based on whether the number of monitoring occasions of the first search space set is equal to the number of monitoring occasions of the second search space set in the same slot.

In a possible implementation 2.1.1, the number of monitoring occasions of the first search space set is equal to the number of monitoring occasions of the second search space set in the same slot.

If the first search space set and the second search space set in the same slot have the same number of monitoring occasions, monitoring occasions of the first search space set within the slot and monitoring occasions of the second search space set within the slot are the associated monitoring occasions.

For example, the $n^{th}$ monitoring occasion of the first search space set and the $m^{th}$ monitoring occasion of the second search space set within the same slot are the associated monitoring occasions. Here, both n and m are positive integers, and n and m may be equal or different.

In the implementation, the associated monitoring occasions can be determined in a simple manner within the same slot, consuming fewer terminal resources and reducing the complexity.

It should be noted that, if there is an unassociated monitoring occasion in the same slot, then this monitoring occasion is determined as a monitoring occasion for the single transmission.

In a possible implementation 2.1.2, the number of monitoring occasions of the first search space set is not equal to the number of monitoring occasions of the second search space set.

If the number of monitoring occasions in the first search space set is not equal to the number of monitoring occasions in the second search space set within the same slot, any of the following cases is included.

Case 1: a first monitoring occasion in the slot and a second monitoring occasion in the slot are the associated monitoring occasions.

In an implementation, the $n^{th}$ monitoring occasion of the first search space set and the $m^{th}$ monitoring occasion of the second search space set within the same slot are the associated monitoring occasions. Here, both n and m are positive integers, and n and m may be equal or different.

It should be noted that, when there is an unassociated monitoring occasion (that is, this monitoring occasion is not used to transmit the same PDCCH together with other monitoring occasions) in the same slot, the unassociated monitoring occasion is determined as a monitoring occasion for the single transmission.

Case 2: monitoring occasions of the first search space set and the second search space set are all unassociated monitoring occasions.

That is, the monitoring occasions of the first search space set and the second search space set are monitoring occasions for the single transmission.

Case 3: monitoring occasions in the first search space set in the slot are all unassociated monitoring occasions, and $n^{th}$ and $m^{th}$ monitoring occasions in the second search space set in the slot are associated monitoring occasions, where n and m satisfy a predefined relationship, and both m and n are positive integers.

Here, the predefined relationship between n and m may be determined according to actual requirements, for example, two adjacent monitoring occasions are the associated monitoring occasions. For example, monitoring occasions at an interval of one monitoring occasion are associated monitoring occasions, for example, the first and third monitoring occasions in the same search space set are associated monitoring occasions.

It should be noted that the first search space set and the second search space set in the embodiments of the present application are only used to distinguish two search space sets. When implementing the solution of the case 3, the search space set for repeated transmission of the PDCCH may be any one of the two search space sets, as long as the terminal device and the network device side transmit and detect the PDCCH according to the consistent understanding.

Therefore, in the embodiments of the present application, the case of repeated transmission in the same slot is provided, and a solution of how to understand which monitoring occasions are associated monitoring occasions is provided, thereby reducing the number of times of blind combination on the terminal device side and improving the success rate of PDCCH transmission.

Solution 2: the indication information includes: per slot monitoring mode+associated search space sets+configuration information of inter-slot repeated transmission (hereinafter referred to as indication information 5).

Based on the indication information 5, the terminal device may determine that the repeated transmission mode of the PDCCH is inter-slot repeated transmission in the per slot monitoring mode. Thus, the terminal device can determine the associated monitoring occasions from different slots, thereby effectively reducing the number of times of blind combination.

When the repeated transmission mode of the PDCCH is inter-slot repeated transmission, the associated monitoring occasions of the same PDCCH come from different slots. During implementation, the associated monitoring occasions of the same PDCCH may come from two or more slots. For ease of understanding, two slots are taken as an example for description in the following.

The terminal device may determine two slots satisfying a second predefined relationship are associated slots. The second predefined relationship may be configured according to specific conditions, and for example, may be implemented as two adjacent slots or two non-adjacent slots.

For the associated slots, the associated monitoring occasions may include any of the following cases.

Case 1: in the associated slots, a monitoring occasion in the first search space set in any slot and a monitoring occasion in the second search space set in another slot are the associated monitoring occasions.

The implementation can be understood as the implementation of inter-span repeated transmission from different slots described in section 1.2 of solution 1 of part 1, which will not be repeated here. It should be noted that the case 1 is that the associated monitoring occasions come from the first search space set and the second search space set. In addition, as described in the case 2, the associated monitoring occasions may also come from the same search space set.

Case 2: in the associated slots, a monitoring occasion in the first search space set in any slot and a monitoring occasion in the first search space set in another slot are the associated monitoring occasions.

Similar to the above, it should be noted that the first search space set and the second search space set in the embodiment of the present application are only used to distinguish two search space sets. When implementing the solution of the case 2, the search space set for repeated transmission of the PDCCH may be any one of the two search space sets, as long as the terminal device and the network device side transmit and detect the PDCCH according to the consistent understanding.

Therefore, in the embodiment of the present application, a specific association mode of monitoring occasions among different slots is given, thereby effectively reducing the number of times of blind combination and improving the reliability of PDCCH transmission.

It should be noted that, if there is an unassociated slot (that is, there is a slot that is not used for repeated transmission of the same PDCCH together with other slots), the monitoring occasions in the unassociated slot are all determined as unassociated monitoring occasions. That is, the monitoring occasions in the unassociated slot are all monitoring occasions for the single transmission.

Alternatively, the repeated transmission mode of the PDCCH in the unassociated slot may also be determined as intra-slot repeated transmission.

In the above, the embodiments of the present application provide the ways to determine the associated monitoring occasions in different cases.

After determining the associated monitoring occasions, the terminal device may determine to detect which PDCCH candidates according to its own capability. As mentioned above, in order to facilitate the selection of detected PDCCHs, the embodiments of the present application propose the candidate detection unit which may be a PDCCH candidate or a PDCCH candidate pair. One monitoring occasion may correspond to one or more candidate detection units. Correspondingly, as mentioned above, in the embodiments of the present application, one span or one slot is taken as one monitoring unit, and then the step of detecting the PDCCH according to the associated monitoring occasions may be implemented as shown in FIG. 3, including the following.

Step 301: for each monitoring unit, complexity of one candidate detection unit in the associated monitoring occasions is determined as first complexity, and complexity of one candidate detection unit of any unassociated monitoring occasion is determined as second complexity.

Step 302: based on a monitoring capability of the terminal device in the monitoring unit, a candidate detection unit is determined from candidate detection units contained in the monitoring unit for detection.

Therefore, in the embodiment of the present application, the candidate detection unit can be screened for detection based on the associated monitoring occasions.

That is, when one candidate detection unit is one PDCCH candidate, the first complexity is the complexity of one PDCCH candidate; and when one candidate detection unit is a PDCCH candidate pair, the first complexity is the complexity of the PDCCH candidate pair.

Taking one span being one monitoring unit as an example, when the span includes a monitoring occasion, the monitoring occasion may be an unassociated monitoring occasion, and the complexity of each candidate detection unit in the monitoring occasion is the second complexity. The monitoring occasion may be one of the associated monitoring occasions, and the complexity corresponding to the monitoring occasion may be determined according to cases.

Since the associated monitoring occasions have an association relationship, how the candidate detection units in the associated monitoring occasions are divided needs to be explained. Different division methods will affect the screening of the detected PDCCH by the terminal device. In a possible embodiment, partial candidate detection units in two associated monitoring occasions in the monitoring unit belong to the monitoring unit, and partial complexity in the first complexity belongs to the monitoring unit.

In a possible embodiment, the partial candidate detection units are candidate detection units, which are within the monitoring unit, in the two associated monitoring occasions in the monitoring unit.

Taking span being one monitoring unit as an example, it is assumed that the associated monitoring occasions include a monitoring occasion 1 and a monitoring occasion 2. If the monitoring occasion 1 is in the span 1 and the monitoring occasion 2 is also in the span 1, then candidate detection units of the monitoring occasion 1 and the monitoring occasion 2 all belong to span 1. If the monitoring occasion 1 is in span 1 and the monitoring occasion 2 is in span 2, then candidate detection units of the monitoring occasion 1 all belong to span 1, and the candidate detection units of the monitoring occasion 2 all belong to span 2.

Therefore, in the embodiment of the present application, the candidate detection units are divided into the corresponding monitoring units in a simple manner, and the implementation occupies fewer terminal resources and reduces the power consumption.

Correspondingly, the complexity of each candidate detection unit can also be divided according to actual requirements. For example, a partial candidate detection unit is divided into the corresponding monitoring unit, while the partial complexity in the first complexity is also divided into the corresponding monitoring unit, which is implemented as follows.

Complexity division mode 1: if the network device side does not indicate a clear decoding method, the complexity of a partial candidate detection unit of one candidate detection unit in the associated monitoring occasions is the third complexity, and a sum of third complexities of all partial candidate detection units in the one candidate detection unit is the first complexity.

For example, one candidate detection unit included in the associated monitoring occasions includes a PDCCH candidate 1 and a PDCCH candidate 2. The PDCCH candidate 1 belongs to span 1, and the PDCCH candidate 2 belongs to span 2. If the first complexity of one candidate detection unit such as a PDCCH candidate pair is K, a sum of the third complexity of the PDCCH candidate 1 and the third complexity of the PDCCH candidate 2 is K. Correspondingly, the PDCCH candidate 1 and the PDCCH candidate 2 may share K equally, or may not share K equally, both of which are applicable to the embodiment of the present application.

Complexity division mode 2: if the network device side configures independent decoding, the complexity of the partial candidate detection unit of the monitoring unit is half of the first complexity; or, the complexity of the partial candidate detection unit of the monitoring unit is half of the first complexity; or, the complexity of the partial candidate detection unit of the monitoring unit is the second complexity. That is, the complexity of the partial candidate detection unit divided into the current monitoring unit is the same as the complexity of the candidate detection unit in the unassociated monitoring time, that is, the complexity of the monitoring occasion for the single transmission.

Complexity division mode 3: if the network device side configures joint decoding, the complexity of the partial candidate detection unit of the monitoring unit is the third complexity, and a sum of third complexities of all partial candidate detection units in one candidate detection unit is the first complexity.

In the embodiments of the present application, a clear scheme is given for the definition of the complexity of candidate monitoring units in each monitoring unit, thereby calculating the complexity in a simple manner, occupying fewer terminal resources, and reducing the power consumption.

In some other embodiments, for the case of repeated transmission among different monitoring units, if the network device side indicates to perform joint decoding on the PDCCH, the terminal device may also perform independent decoding on the PDCCH. For example, when the network side configures joint decoding, the terminal device performs independent decoding on the PDCCH. For example, the PDCCH may be decoded in one monitoring unit, and no detection may be performed in another monitoring unit due to exceeding the monitoring capability of the terminal, so that the decoding complexity of each monitoring unit does not exceed the terminal capability.

In order to facilitate the understanding of the embodiments provided by the embodiments of the present application, the detection method for the physical downlink control channel provided by the embodiments of the present application will be described below in conjunction with specific embodiments.

Embodiment 1 (corresponding to the association modes 1.1-1.3 in Part 1).

The network device side indicates that the PDCCH monitoring mode of the terminal device is per span PDCCH monitoring, and the related configuration of PDCCH repeated transmission is that two associated search space sets (that is, the first search space set and the second search space set) are associated. Since the PDCCH repeated transmission mode is not configured on the terminal device, the terminal device may consider that the default transmission mode is intra-slot repeated transmission. That is, the same PDCCH may be transmitted in two monitoring occasions in the first search space set and the second search space set in one slot. The first search space set and the second search space set may be the same search space set or different search space sets. Correspondingly, two monitoring occasions in the first search space set and the second search space set may be in the same search space set or in different search space sets. Moreover, the first search space set and the second search space set may be in the same control resource set, meaning that the PDCCH is repeatedly transmitted twice by one TRP; or the first search space set and the second search space set may not be in the same control resource set, meaning that the PDCCH is repeatedly transmitted twice by two TRPs, which is not limited in the present application.

In the above case, the terminal device may determine that the $n^{th}$ monitoring occasion of the first search space set is associated with the $n^{th}$ monitoring occasion of the second search space set. According to different symbols configured for the monitoring occasions, the association relationship may be intra-span repeated transmission. As shown in FIG. 2A, the first search space set and the second search space set respectively contain four monitoring occasions, and every two associated monitoring occasions are within the same span. The division of the span is determined according to all search space sets to be monitored in one slot, and other search space sets are omitted in FIG. 2A.

The association relationship may also be inter-span repeated transmission. Specifically, as shown in FIG. 2B, every two associated monitoring occasions are in different spans.

In addition, the association relationship may be a hybrid mode of inter-span repeated transmission and intra-span repeated transmission. As shown in FIG. 2C, there are inter-span repeated transmission for span 1 and span 2, and intra-span repeated transmission for span 3 and span 4 respectively.

Since the current PDCCH monitoring mode of the terminal device is per span PDCCH monitoring mode, the terminal device may respectively determine the monitored PDCCH candidates in each span. If the $n^{th}$ monitoring occasion of the first search space set and the $n^{th}$ monitoring occasion of the second search space set are in different spans, the terminal device determines that the two monitoring occasions are included in the calculation of monitored candidate detection units in the two spans. The monitored candidate detection unit may be a PDCCH candidate, a PDCCH candidate pair, or other physical resources for PDCCH transmission. Moreover, when the number of candidate detection units corresponding to the monitoring capability of the terminal is calculated, the unit for measuring the monitored candidate detection units may be the number of PDCCH candidates, the number of PDCCH candidate pairs, blind detection unit, blind detection complexity unit, complexity unit, etc. The blind detection unit, blind detection complexity unit, complexity unit or the like is the processing complexity when detecting the PDCCH candidate or PDCCH candidate pair. In the present application, the complexity unit replaces the monitored candidate detection unit for measuring the monitored candidate detection unit. It should be understood that the complexity unit, the monitored candidate detection unit, the number of PDCCH candidates, the number of PDCCH candidate pairs, the blind detection unit, the blind detection complexity unit, etc. may be replaced equivalently.

For the inter-span repeated transmission, the monitored candidate detection unit may be determined by the following method.

In the blind detection, the number of complexity units for detecting one candidate detection unit (for example, one PDCCH candidate pair, that is, two PDCCH candidates for transmitting the same PDCCH) is X (for example, the value of X may be an integer such as 1, 2, 3, etc., or a decimal between 1 and 2, which is not limited in the present application). If the monitoring occasions of one PDCCH candidate pair are divided into 2 spans, the candidate detection unit and/or corresponding complexity unit of each slot or span may be determined according to at least one of the following methods:

When the terminal device detects the PDCCH, the terminal device performs detection (joint detection or independent decoding, depending on the configuration of the network device side) according to the PDCCH candidate pair, but splits the complexity unit (that is, the first complexity) into 2 spans.

One complexity unit may be evenly split into 2 monitoring occasions, e.g., X/2.

Or, one complexity unit is unevenly split into two monitoring occasions, for example, the complexity unit of the first slot or span is Y, and the complexity unit of the second slot or span is (X-Y) (for example, one monitoring occasion is 1, and the other monitoring occasion is 0.5).

Or, the complexity units of the spans are all the complexity during the single transmission of the PDCCH.

When the terminal device detects the PDCCH, the terminal device independently detects (decodes) the PDCCH candidate pair, and evenly splits the complexity unit into 2 spans, or calculates the complexity unit according to the single transmission of the PDCCH for each slot or span. In this case, even if the network device side configures the terminal device to perform joint decoding (for example, configuring the terminal device by using Radio Resource Control (RRC) signaling to perform soft combination decoding, etc.), the terminal device also performs independent decoding.

Embodiment 2 (corresponding to the association mode 1 in Part 2).

If the indication information indicates that the PDCCH monitoring mode of the terminal device is per span PDCCH monitoring, the related configuration of PDCCH repeated transmission is that the first search space set is associated with the second search space set. Since the PDCCH repeated transmission method is not configured, the behavior of the terminal device is vague, and the behavior of the terminal device needs to be defined in this case. For example, it can be considered that the default PDCCH repeated transmission mode is intra-span repeated transmission, that is, it corresponds to the monitoring capability of the PDCCH.

In the transmission mode, the terminal device determines the number of monitoring occasions in each span, and determines the association relationship of monitoring occasions in each span. For example, in each span, the $n^{th}$ monitoring occasion of any one of the first and second search space sets is associated with the $n^{th}$ monitoring occasion of the other search space set in the first and second search space sets. Here, any one search space set and the other search space set in the first and second search space sets refer to the first one (the search space set with the smallest index) and the second one (the search space set with a slightly larger index) among the associated first and second search space sets configured on the network device side.

In this case, the method for determining the monitored candidate detection unit is: the terminal device determines two PDCCH candidates in two associated monitoring occasions as one PDCCH candidate pair, for example, two PDCCH candidates with the same Aggregation Level (AL) value and the same PDCCH candidate index in two monitoring occasions are determined as one PDCCH candidate pair. The terminal device uses the associated PDCCH candidate pairs in two monitoring occasions for determining the PDCCH candidate pair of the current slot or the current span.

Specifically, assuming that the terminal device detects that the number of complexity units of the one PDCCH candidate pair is X (for example, X PDCCH candidates, X complexity units, etc.), and the number of complexity units corresponding to the maximum number of candidate detection units that the terminal device can monitor in one slot or span is M, then the number of PDCCH candidate pairs that the terminal device can monitor in one slot or span is M/X. Therefore, the terminal device can determine which M/X PDCCH candidate pairs can be monitored in ascending order of the indexes of the search space sets or the serial number of a set composed of 2 monitoring occasions or the serial number of a set composed of 2 PDCCH candidate pairs or the like.

In all the embodiments of the present application, after the terminal device determines which PDCCH candidate pairs or PDCCH candidates can be used to calculate the monitored candidate detection unit of which slot or span, the present application does not limit the method for determining the specific monitored candidate detection unit.

If the numbers of monitoring occasions of two associated search space sets are not equal in a span, for example, there is only a monitoring occasion of the first search space set, but not the monitoring occasion of the second search space set in the first span in FIG. 2B-2C; and since there is no unassociated monitoring occasion in this case, the monitoring behavior of the terminal device also needs to be defined. In the span in which the numbers of monitoring occasions are not equal, the terminal device can adopt at least one of the following monitoring behaviors.

When the numbers of monitoring occasions of two associated search space sets are both greater than 1, the terminal device determines that the $n^{th}$ monitoring occasion of one search space set is associated with the $n^{th}$ monitoring occasion of the other search space set, and other unassociated monitoring occasions are used for the single transmission of the PDCCH.

In particular, when there is a monitoring occasion of only one search space set in one span, the terminal device determines that the search space set is used for the single transmission of the PDCCH.

Or, as long as the numbers of monitoring occasions of the first search space set and the second search space set are not equal in one span, the terminal device determines that both the first search space set and the second search space set are used for the single transmission of the PDCCH, or all monitoring occasions are used for the single transmission of the PDCCH.

In addition, it is also possible to avoid the unequal numbers of monitoring occasions of the first search space set and the second search space set in one span by limiting the scheduling or configuration on the network device side. That is, when the PDCCH monitoring capability of the terminal device is per span PDCCH monitoring, the related configuration of PDCCH repeated transmission is that the first search space set is associated with the second search space set, and the terminal device expects or determines that the number of monitoring occasions configured in the first search space set and the number of monitoring occasions configured in the second search space set in each span are always equal.

Embodiment 3 (corresponding to Solution 2 in Part 1, intra-span repeated transmission).

If the PDCCH monitoring mode of the terminal device is per span PDCCH monitoring, the related configuration of PDCCH repeated transmission is intra-span repeated transmission and associated search space sets, and the behavior of the terminal device is the same as that in the embodiment 2.

The terminal device determines the number of monitoring occasions in each span, and determines the association relationship of monitoring occasions in each span. For example, in the first search space set and the second search space set in each span, the $n^{th}$ monitoring occasion of any search space set is associated with the $n^{th}$ monitoring occasion of the other search space set. Here, any one search space set and the other search space set in the first and second search space sets refer to the first one (the search space set with the smallest index) and the second one (the search space set with a slightly larger index) among the associated first and second search space sets configured on the network device side.

In this case, the method for determining the monitored candidate detection unit is an intra-span determining method.

If the numbers of monitoring occasions of two associated search space sets are not equal in a span, for example, there is only a monitoring occasion of the first search space set, but not the monitoring occasion of the second search space set in the first span in FIG. 2C; and since there is no unassociated monitoring occasion in this case, the monitoring behavior of the terminal device also needs to be defined. In the span in which the numbers of monitoring occasions are not equal, the terminal device can adopt at least one of the following monitoring behaviors.

When the numbers of monitoring occasions of two associated search space sets are both greater than 1, the terminal device determines that the $n^{th}$ monitoring occasion of any one search space set is associated with the $n^{th}$ monitoring occasion of the other search space set, and other unassociated monitoring occasions are used for the single transmission of the PDCCH.

In particular, when there is a monitoring occasion of only one search space set in one span, the terminal device determines that the search space set is used for the single transmission of the PDCCH.

Or, as long as the numbers of monitoring occasions of the first search space set and the second search space set are not equal in one span, the terminal device determines that both the first search space set and the second search space set are used for the single transmission of the PDCCH, or all monitoring occasions are used for the single transmission of the PDCCH.

In addition, it is also possible to avoid the unequal numbers of monitoring occasions of the first search space set and the second search space set in one span by limiting the scheduling or configuration on the network device side. That is, when the PDCCH monitoring capability of the terminal device is per span PDCCH monitoring, the related configuration of PDCCH repeated transmission is that the first search space set is associated with the second search space set, and the terminal device expects or determines that the number of monitoring occasions configured in the first search space set and the number of monitoring occasions configured in the second search space set in each span are always equal. The terminal device determines the number of monitoring occasions in each span, and determines the association relationship of the monitoring occasions in the span.

Embodiment 4 (corresponding to Solution 3, inter-span repeated transmission).

If the PDCCH monitoring capability of the terminal device is per span PDCCH monitoring, the related configuration of PDCCH repeated transmission is inter-span repeated transmission and associated search space sets, and the terminal device can determine which monitoring occasions are associated by the following method.

The terminal device firstly determines that two adjacent spans or every two adjacent spans can be used for PDCCH repeated transmission, and the $n^{th}$ monitoring occasion in the first span is associated with the $n^{th}$ monitoring occasion in the second span (the association method for monitoring occasions of inter-span).

Here, the $n^{th}$ monitoring occasion in the first span is associated with the $n^{th}$ monitoring occasion in the second span, and it may be at least one of the following cases The $n^{th}$ monitoring occasion of the first search space set in the first span is associated with the $n^{th}$ monitoring occasion of the second search space set in the second span.

The $n^{th}$ monitoring occasion of the second search space set in the first span is associated with the $n^{th}$ monitoring occasion of the first search space set in the second span.

The $n^{th}$ monitoring occasion of the kth search space set in the first span is associated with the $n^{th}$ monitoring occasion of the kth search space set in the second span (this case may be used for repeated transmission in a single TRP case).

Further, if the number of spans is an odd number, the terminal device determines that the first or last span is not associated with other spans in one slot, and is used for repeated transmission of the PDCCH within the span or single transmission of the PDCCH.

The two spans may also be two spans that include monitoring occasions of associated search space sets. For example, only the monitoring occasion that includes any one associated search space set can be used for inter-span repeated transmission, or the monitoring occasions that need to include two associated search space sets (i.e., at least one monitoring occasion that needs to include any one of the associated first and second search space sets and at least one monitoring occasion that includes the other associated search space set) can be used for inter-span repeated transmission, etc. In this case, the two adjacent spans refer to two adjacent spans among spans that include the monitoring occasions of the associated first and second search space sets.

Moreover, which two spans can be used for inter-span repeated transmission may also depend on the configuration on the network device side. For example, the network device side configures that the first span and the third span in one slot on the terminal device are associated and used for repeated transmission of the same PDCCH; for another example, the network device side configures that the first span is associated with the fourth span, and the second span is associated with the third span in one slot on the terminal device. After determining two or more spans for the PDCCH repeated transmission, the terminal device may determine the association relationship between monitoring occasions within two spans according to the above association method for monitoring occasions of inter-span.

Moreover, if the PDCCH monitoring capability of the terminal device is per span PDCCH monitoring, the related configuration of PDCCH repeated transmission is associated search space sets. In this case, the terminal device can also determine that the default PDCCH repeated transmission mode is inter-span repeated transmission. The behavior of the terminal device is the same as the behavior described above.

Embodiment 5 (corresponding to Solution 2 in Part 2).

If the PDCCH monitoring mode of the terminal device is per slot PDCCH monitoring, the related configuration of PDCCH repeated transmission is inter-slot repeated transmission and associated search space sets. If the terminal device determines that the first search space set and the second search space set in two slots are associated according to the configuration on the network device side or a predefined rule, the association method of monitoring occasions may be: the $n^{th}$ monitoring occasion in the first slot is associated with the $n^{th}$ monitoring occasion in the second slot. That is, similar to the method for determining monitoring occasions during the inter-span repeated transmission in the embodiment 4, there is only a need to replace spans by slots.

The way to determine the candidate detection unit can refer to the related contents in FIG. 3, and the repeated description thereof will be omitted.

Embodiment 6 (corresponding to Solution 1 in Part 2).

If the PDCCH monitoring mode of the terminal device is per slot PDCCH monitoring, the related configuration of PDCCH repeated transmission is associated search space sets, and in this case, the terminal device may determine that the PDCCH repeated transmission mode is intra-slot repeated transmission. The association relationship of monitoring occasions may be: the $n^{th}$ monitoring occasion of any one of the first and second search space sets is associated with the $n^{th}$ monitoring occasion of the other search space set in the first and second search space sets.

The way to determine the candidate detection unit can refer to the related contents in FIG. 3, and the repeated description thereof will be omitted.

As shown in FIG. 4, an embodiment of the present application provides a schematic structural diagram of a terminal device, which may be a network device side or a terminal device, including a processor 400, a memory 401 and a transceiver 402. The processor 400 is responsible for managing the bus architecture and general processing, and the memory 401 may store the data used by the processor 400 when performing the operations. The transceiver 402 is configured to receive and send the data under the control of the processor 400.

The bus architecture may include any numbers of interconnected buses and bridges, and specifically link various circuits of one or more processors represented by the processor 400 and the memory represented by the memory 401. The bus architecture may further link various other circuits such as the peripheral device, voltage regulator and power management circuit, which are all well known in the art and thus will not be further described again herein. The bus interface provides an interface. The processor 400 is responsible for managing the bus architecture and general processing, and the memory 401 may store the data used by the processor 400 when performing the operations.

The procedure disclosed by the embodiments of the present application may be applied in the processor 400 or implemented by the processor 400. In the implementation process, each step of the signal processing flow may be completed by the integrated logic circuit of hardware in the processor 400 or the instruction in the form of software. The processor 400 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software devices in the processor. The software devices may be located in the random access memory, flash memory, read only memory, programmable read only memory or electrically erasable programmable read only memory, register and other mature storage medium in the art. The storage medium is located in the memory 401, and the processor 400 reads the information in the memory 401 and completes the steps of the processing flow of data transmission in combination with its hardware.

Specifically, the processor 400 is configured to read the program in the memory 401 and perform:

receiving indication information of a PDCCH sent by a network device side, where the indication information at least includes an association relationship between search space sets and a specific monitoring mode;

determining associated monitoring occasions of the PDCCH according to the indication information; and detecting the PDCCH according to the associated monitoring occasions.

In some possible embodiments, the search space sets with the association relationship include a first search space set and a second search space set.

In some possible embodiments, when determining the associated monitoring occasions of the PDCCH according to the indication information, the processor is configured to:

in a case that the specific monitoring mode is a per span monitoring mode, determine that an association mode of the monitoring occasions is associating a monitoring occasion of the first search space set with a monitoring occasion of the second search space set based on the indication information.

In some possible embodiments, when determining the associated monitoring occasions of the PDCCH according to the indication information, the processor is configured to:

in a case that the specific monitoring mode is a per span monitoring mode, determine that a repeated transmission mode of the PDCCH is intra-span repeated transmission based on the indication information; or, in a case that the indication information further includes configuration information of intra-span repeated transmission, determine that a repeated transmission mode of the PDCCH is the intra-span repeated transmission;

where the associated monitoring occasions are within the same span.

In some possible embodiments, for the intra-span repeated transmission mode, in a case that the first search space set and the second search space set in the same span have the same number of monitoring occasions, monitoring occasions of the first search space set within the span and monitoring occasions of the second search space set within the span are the associated monitoring occasions.

In some possible embodiments, in a case that the number of monitoring occasions in the first search space set is not equal to the number of monitoring occasions in the second search space set within the same span, any of the following cases is included:

case 1: a monitoring occasion of the first search space set in the span and a monitoring occasion of the second search space set in the span are the associated monitoring occasions;

case 2: monitoring occasions of the first search space set and the second search space set are all unassociated monitoring occasions; and case 3: monitoring occasions in the first search space set in the span are all unassociated monitoring occasions, and the $n^{th}$ monitoring occasion and the $m^{th}$ monitoring occasion in the second search space set in the span are associated monitoring occasions, where n and m satisfy a predefined relationship, and both m and n are positive integers.

In some possible embodiments, when determining the associated monitoring occasions of the PDCCH according to the indication information, the processor is configured to:

in a case that the specific monitoring mode is a per span monitoring mode, determine that a repeated transmission mode of the PDCCH is inter-span repeated transmission based on the indication information; or, in a case that the indication information further includes that a repeated transmission mode of the PDCCH is inter-span repeated transmission, determine that the associated monitoring occasions are among different spans.

In some possible embodiments, for the inter-span repeated transmission mode, two spans satisfying a first predefined relationship are associated spans;

where for the associated spans, any of following cases is included:

case 1: determining that in the associated spans, a monitoring occasion in the first search space set in any span and a monitoring occasion in the second search space set in another span are the associated monitoring occasions; and case 2: determining that in the associated spans, a monitoring occasion in the first search space set in any span and a monitoring occasion in the first search space set in another span are the associated monitoring occasions.

In some possible embodiments, the processor is further configured to:

in a case that an unassociated span exists, determine that monitoring occasions in the unassociated span are all unassociated monitoring occasions, or determine that a repeated transmission mode of the PDCCH in the unassociated span is intra-slot repeated transmission.

In some possible embodiments, when determining the associated monitoring occasions of the PDCCH according to the indication information, the processor is configured to:

in a case that the specific monitoring mode is a per slot monitoring mode and the indication information further includes configuration information that a repeated transmission mode of the PDCCH is inter-slot repeated transmission, determine that the associated monitoring occasions are in different slots.

In some possible embodiments, for the inter-slot repeated transmission mode, two slots satisfying a second predefined relationship are associated slots;

where for the associated slots, any of following cases is included:

case 1: in the associated slots, a monitoring occasion in the first search space set in any slot and a monitoring occasion in the second search space set in another slot are the associated monitoring occasions; and case 2: in the associated slots, a monitoring occasion in the first search space set in any slot and a monitoring occasion in the first search space set in another slot are the associated monitoring occasions.

In some possible embodiments, the processor is further configured to:

in a case that an unassociated slot exists, determine that monitoring occasions in the unassociated slot are all unassociated monitoring occasions, or determine that a repeated transmission mode of the PDCCH in the unassociated slot is intra-slot repeated transmission.

In some possible embodiments, when determining the associated monitoring occasions of the PDCCH according to the indication information, the processor is configured to:

in a case that the specific monitoring mode is a per slot monitoring mode, determine that a repeated transmission mode of the PDCCH is intra-slot repeated transmission based on the indication information; or in a case that the specific monitoring mode is a per span monitoring mode, determine that a repeated transmission mode of the PDCCH is intra-slot repeated transmission based on the indication information; or in a case that the specific monitoring mode is a per span monitoring mode and the indication information further includes configuration information of intra-slot repeated transmission, determine that a repeated transmission mode of the PDCCH is the intra-slot repeated transmission.

In some possible embodiments, for the intra-slot repeated transmission mode, in a case that the first search space set and the second search space set in a same slot have the same number of monitoring occasions, monitoring occasions of the first search space set within the slot and monitoring occasions of the second search space set within the slot are the associated monitoring occasions.

In some possible embodiments, in a case that the number of monitoring occasions in the first search space set is not equal to the number of monitoring occasions in the second search space set within the same slot, any of the following cases is included:

case 1: the first monitoring occasion in the slot and the second monitoring occasion in the slot are the associated monitoring occasions;

case 2: monitoring occasions of the first search space set and the second search space set are all unassociated monitoring occasions; and case 3: monitoring occasions in the first search space set in the slot are all unassociated monitoring occasions, and the $n^{th}$ monitoring occasion and the $m^{th}$ monitoring occasion in the second search space set in the slot are associated monitoring occasions, where n and m satisfy a predefined relationship, and both m and n are positive integers.

In some possible embodiments, one span or one slot is one monitoring unit, and when detecting the PDCCH according to the associated monitoring occasions, the processor is configured to:

for each monitoring unit, determine complexity of one candidate detection unit in the associated monitoring occasions as first complexity, and determine complexity of one candidate detection unit of any unassociated monitoring occasion as second complexity; where the candidate detection unit is a single PDCCH candidate or a PDCCH candidate pair; and determine, based on a monitoring capability of the terminal device in the monitoring unit, a candidate detection unit from candidate detection units in the monitoring unit for detection.

In some possible embodiments, a partial candidate detection unit in two associated monitoring occasions in the monitoring unit belongs to the monitoring unit, and partial complexity in the first complexity belongs to the monitoring unit.

In some possible embodiments, the partial candidate detection unit is a candidate detection unit, which is within the monitoring unit, in the two associated monitoring occasions in the monitoring unit.

In some possible embodiments, a complexity division mode of the partial complexity includes at least one of the following:

complexity of a partial candidate detection unit in one candidate detection unit in the associated monitoring occasions is third complexity, and a sum of third complexities of all partial candidate detection units in the one candidate detection unit is the first complexity; or, in a case that the network device side configures independent decoding, complexity of a partial candidate detection unit of the monitoring unit is half of the first complexity; or, the complexity of the partial candidate detection unit of the monitoring unit is the second complexity; or, in a case that the network device side configures joint decoding, complexity of a partial candidate detection unit of the monitoring unit is third complexity, and a sum of third complexities of all partial candidate detection units in one candidate detection unit is the first complexity.

In some possible embodiments, the processor is further configured to:

for a case of repeated transmission between different monitoring units, perform independent decoding on the PDCCH in a case that the network device side indicates to perform joint decoding on the PDCCH.

Figure 5:
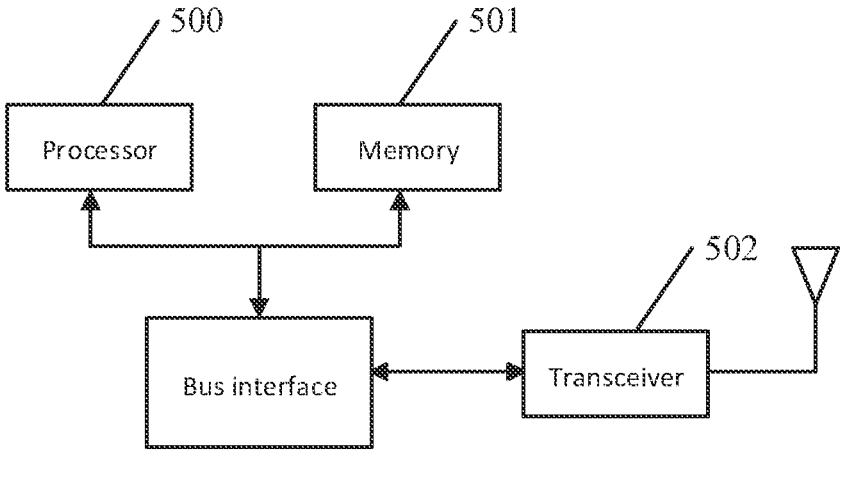
FIG. 5 is a schematic structural diagram of a network device side according to embodiments of the present application.

As shown in FIG. 5, an embodiment of the present application provides a schematic structural diagram of a network device side, which may be a network device side or a terminal side, including a processor 500, a memory 501 and a transceiver 502. The processor 500 is responsible for managing the bus architecture and general processing, and the memory 501 may store the data used by the processor 500 when performing the operations. The transceiver 502 is configured to receive and send the data under the control of the processor 500.

The bus architecture may include any numbers of interconnected buses and bridges, and specifically link various circuits of one or more processors represented by the processor 500 and the memory represented by the memory 501. The bus architecture may further link various other circuits such as peripheral device, voltage regulator and power management circuit, which are all well known in the art and thus will not be further described again herein. The bus interface provides an interface. The processor 500 is responsible for managing the bus architecture and general processing, and the memory 501 may store the data used by the processor 500 when performing the operations.

The procedure disclosed by the embodiments of the present application may be applied in the processor 500 or implemented by the processor 500. In the implementation process, each step of the signal processing flow may be completed by the integrated logic circuit of hardware in the processor 500 or the instruction in the form of software. The processor 500 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software devices in the processor. The software devices may be located in the random access memory, flash memory, read only memory, programmable read only memory or electrically erasable programmable read only memory, register and other mature storage medium in the art. The storage medium is located in the memory 501, and the processor 500 reads the information in the memory 501 and completes the steps of the processing flow of data transmission in combination with its hardware.

Specifically, the processor 500 is configured to read the program in the memory 501 and perform:

sending indication information of a PDCCH to a terminal device, where the indication information at least includes an association relationship between search space sets and a specific monitoring mode.

In some possible embodiments, in a case that the specific monitoring mode is a per span monitoring mode, the indication information further includes configuration information of intra-span repeated transmission.

In some possible embodiments, in a case that the specific monitoring mode is a per slot monitoring mode, the indication information further includes configuration information that a repeated transmission mode of the PDCCH is inter-slot repeated transmission.

In some possible embodiments, in a case that the specific monitoring mode is a per span monitoring mode, the indication information further includes configuration information of intra-slot repeated transmission.

Figure 6:
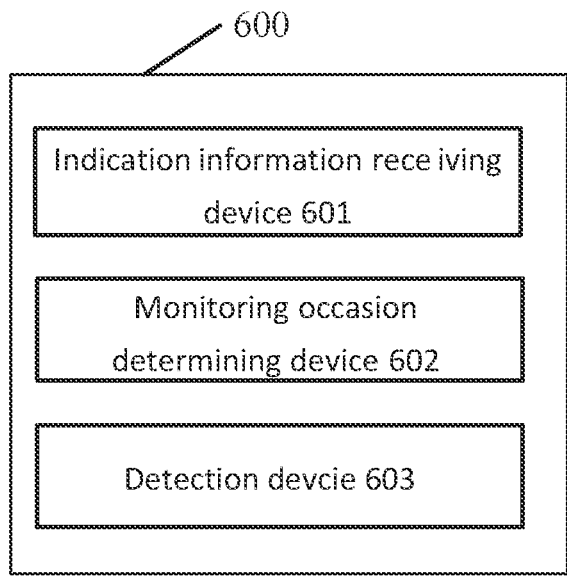
FIG. 6 is a block diagram of a detection apparatus 600 for a PDCCH according to embodiments of the present application.

As shown in FIG. 6, an embodiment of the present application provides a detection apparatus 600 for a physical downlink control channel, which is applied to a terminal device, including:

an indication information receiving device 601, configured to receive indication information of a PDCCH sent by a network device side, where the indication information at least includes an association relationship between search space sets and a specific monitoring mode;

a monitoring occasion determining device 602, configured to determine associated monitoring occasions of the PDCCH according to the indication information; and a detection device 603, configured to detect the PDCCH according to the associated monitoring occasions.

In some possible embodiments, the associated search space sets include a first search space set and a second search space set.

In some possible embodiments, when determining the associated monitoring occasions of the PDCCH according to the indication information, the monitoring occasion determining device is configured to:

in a case that the specific monitoring mode is a per span monitoring mode, determine that an association mode of the monitoring occasions is associating a monitoring occasion of the first search space set with a monitoring occasion of the second search space set based on the indication information.

In some possible embodiments, when determining the associated monitoring occasions of the PDCCH according to the indication information, the monitoring occasion determining device is configured to:

in a case that the specific monitoring mode is a per span monitoring mode, determine that a repeated transmission mode of the PDCCH is intra-span repeated transmission based on the indication information; or, in a case that the indication information further includes configuration information of intra-span repeated transmission, determine that the repeated transmission mode of the PDCCH is the intra-span repeated transmission; where the associated monitoring occasions are within the same span.

In some possible embodiments, for the intra-span repeated transmission mode, in a case that the first search space set and the second search space set in the same span have the same number of monitoring occasions, monitoring occasions of the first search space set within the span and monitoring occasions of the second search space set within the span are the associated monitoring occasions.

In some possible embodiments, in a case that the number of monitoring occasions in the first search space set is not equal to the number of monitoring occasions in the second search space set within the same span, any of the following cases is included:

case 1: a monitoring occasion of the first search space set in the span and a monitoring occasion of the second search space set in the span are the associated monitoring occasions;

case 2: monitoring occasions of the first search space set and the second search space set are all unassociated monitoring occasions; and case 3: monitoring occasions in the first search space set in the span are all unassociated monitoring occasions, and the $n^{th}$ monitoring occasion and the $m^{th}$ monitoring occasion in the second search space set in the span are associated monitoring occasions, where n and m satisfy a predefined relationship, and both m and n are positive integers.

In some possible embodiments, when determining the associated monitoring occasions of the PDCCH according to the indication information, the monitoring occasion determining device is configured to:

in a case that the specific monitoring mode is a per span monitoring mode, determine that a repeated transmission mode of the PDCCH is inter-span repeated transmission based on the indication information; or, in a case that the indication information further includes that a repeated transmission mode of the PDCCH is inter-span repeated transmission, determine that the associated monitoring occasions are among different spans.

In some possible embodiments, for the inter-span repeated transmission mode, two spans satisfying a first predefined relationship are associated spans;

where for the associated spans, any of following cases is included:

case 1: determining that in the associated spans, a monitoring occasion in the first search space set in any span and a monitoring occasion in the second search space set in another span are the associated monitoring occasions; and case 2: determining that in the associated spans, a monitoring occasion in the first search space set in any span and a monitoring occasion in the first search space set in another span are the associated monitoring occasions.

In some possible embodiments, the monitoring occasion determining device is further configured to:

in the associated spans an unassociated exists, determine that monitoring occasions in the unassociated span are all unassociated monitoring occasions, or determine that a repeated transmission mode of the PDCCH in the unassociated span is intra-slot repeated transmission.

In some possible embodiments, when determining the associated monitoring occasions of the PDCCH according to the indication information, the monitoring occasion determining device is configured to:

in a case that the specific monitoring mode is a per slot monitoring mode and the indication information further includes configuration information that a repeated transmission mode of the PDCCH is inter-slot repeated transmission, determine that the associated monitoring occasions are in different slots.

In some possible embodiments, for the inter-slot repeated transmission mode, two slots satisfying a second predefined relationship are associated slots;

where for the associated slots, any of following cases is included:

case 1: in the associated slots, a monitoring occasion in the first search space set in any slot and a monitoring occasion in the second search space set in another slot are the associated monitoring occasions; and case 2: in the associated slots, a monitoring occasion in the first search space set in any slot and a monitoring occasion in the first search space set in another slot are the associated monitoring occasions.

In some possible embodiments, the monitoring occasion determining device is further configured to:

in a case that an unassociated slot exists, determine that monitoring occasions in the unassociated slot are all unassociated monitoring occasions, or determine that a repeated transmission mode of the PDCCH in the unassociated slot is intra-slot repeated transmission.

In some possible embodiments, when determining the associated monitoring occasions of the PDCCH according to the indication information, the monitoring occasion determining device is configured to:

in a case that the specific monitoring mode is a per slot monitoring mode, determine that a repeated transmission mode of the PDCCH is intra-slot repeated transmission based on the indication information; or in a case that the specific monitoring mode is a per span monitoring mode, determine that a repeated transmission mode of the PDCCH is intra-slot repeated transmission based on the indication information; or in a case that the specific monitoring mode is a per span monitoring mode and the indication information further includes configuration information of intra-slot repeated transmission, determine that a repeated transmission mode of the PDCCH is the intra-slot repeated transmission.

In some possible embodiments, for the intra-slot repeated transmission mode, in a case that the first search space set and the second search space set in a same slot have the same number of monitoring occasions, monitoring occasions of the first search space set within the slot and monitoring occasions of the second search space set within the slot are the associated monitoring occasions.

In some possible embodiments, in a case that the number of monitoring occasions in the first search space set is not equal to the number of monitoring occasions in the second search space set within the same slot, any of the following cases is included:

case 1: the first monitoring occasion in the slot and the second monitoring occasion in the slot are the associated monitoring occasions;

case 2: monitoring occasions of the first search space set and the second search space set are all unassociated monitoring occasions; and case 3: monitoring occasions in the first search space set in the slot are all unassociated monitoring occasions, and the $n^{th}$ monitoring occasion and the $m^{th}$ monitoring occasion in the second search space set in the slot are associated monitoring occasions, where n and m satisfy a predefined relationship, and both m and n are positive integers.

In some possible embodiments, one span or one slot is one monitoring unit, and when detecting the PDCCH according to the associated monitoring occasions, the monitoring occasion determining device is configured to:

for each monitoring unit, determine complexity of one candidate detection unit in the associated monitoring occasions as first complexity, and determine complexity of one candidate detection unit of any unassociated monitoring occasion as second complexity; where the candidate detection unit is a single PDCCH candidate or a PDCCH candidate pair; and determine, based on a monitoring capability of the terminal device in the monitoring unit, a candidate detection unit from candidate detection units in the monitoring unit for detection.

In some possible embodiments, a partial candidate detection unit in two associated monitoring occasions in the monitoring unit belongs to the monitoring unit, and partial complexity in the first complexity belongs to the monitoring unit.

In some possible embodiments, the partial candidate detection unit is a candidate detection unit, which is within the monitoring unit, in the two associated monitoring occasions in the monitoring unit.

In some possible embodiments, a complexity division mode of the partial complexity includes at least one of the following:

complexity of a partial candidate detection unit in one candidate detection unit in the associated monitoring occasions is third complexity, and a sum of third complexities of all partial candidate detection units in the one candidate detection unit is the first complexity; or, in a case that the network device side configures independent decoding, the complexity of the partial candidate detection unit of the monitoring unit is half of the first complexity; or, the complexity of the partial candidate detection unit of the monitoring unit is the second complexity; or, in a case that the network device side configures joint decoding, the complexity of the partial candidate detection unit of the monitoring unit is the third complexity, and a sum of third complexities of all partial candidate detection units in one candidate detection unit is the first complexity.

In some possible embodiments, the monitoring occasion determining device is further configured to:

for a case of repeated transmission between different monitoring units, perform independent decoding on the PDCCH in a case that the network device side indicates to perform joint decoding on the PDCCH.

Figure 7:
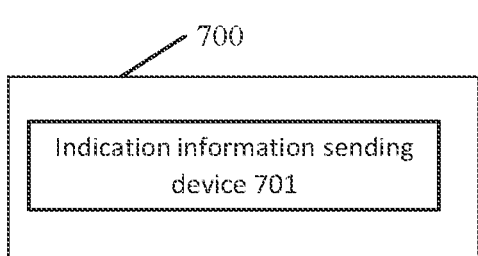
FIG. 7 is a block diagram of a detection apparatus 700 for a PDCCH according to embodiments of the present application.

As shown in FIG. 7, an embodiment of the present application provides a detection apparatus 700 for a physical downlink control channel, which is applied to the network device side, including:

an indication information sending device 701, configured to send indication information of a PDCCH to a terminal device, where the indication information at least includes an association relationship between search space sets and a specific monitoring mode.

In some possible embodiments, in a case that the specific monitoring mode is a per span monitoring mode, the indication information further includes configuration information of intra-span repeated transmission.

In some possible embodiments, in a case that the specific monitoring mode is a per slot monitoring mode, the indication information further includes configuration information that a repeated transmission mode of the PDCCH is inter-slot repeated transmission.

In some possible embodiments, in a case that the specific monitoring mode is a per span monitoring mode, the indication information further includes configuration information of intra-slot repeated transmission.

The present application has been described above by reference to the block diagrams and/or flow charts showing the methods, devices (systems) and/or computer program products according to the embodiments of the present application. It should be understood that one block shown in the block diagrams and/or flow charts and a combination of the blocks shown in the block diagrams and/or flow charts can be implemented by the computer program instructions.

These computer program instructions can be provided to a general-purpose computer, a processor of a dedicated computer and/or another programmable data processing device to produce a machine, so that the instructions executed by the computer processor and/or another programmable data processing device create the methods for implementing the functions and/or actions specified in the blocks of the block diagrams and/or flow charts.

Accordingly, the present application can also be implemented by the hardware and/or software (including the firmware, resident software, microcode and the like). Further, the present application can adopt the form of computer program products on the computer usable or computer readable storage medium, which has the computer usable or computer readable program codes implemented in the medium, to be used by the instruction execution system or used in combination with the instruction execution system. In the context of the present application, the computer usable or computer readable storage medium can be any medium, which can contain, store, communicate with, transmit or transfer the programs, to be used by the instruction execution system, apparatus or device, or used in combination with the instruction execution system, apparatus or device.

What is claimed is:

1. A detection method for a physical downlink control channel, comprising:

receiving indication information of a Physical Downlink Control Channel (PDCCH), sent by a network device side, wherein the indication information at least comprises an association relationship between search space sets and a specific monitoring mode;

determining associated monitoring occasions or associated search space sets of the PDCCH according to the indication information; and detecting the PDCCH according to the associated monitoring occasions or associated search space sets;

wherein the search space sets with the association relationship comprise a first search space set and a second search space set;

wherein one span or one slot is one monitoring unit;

wherein the detecting the PDCCH according to the associated monitoring occasions or associated search space sets, comprises:

determining a PDCCH candidate pair; wherein the PDCCH candidate pair comprises a first PDCCH candidate and a second PDCCH candidate, the first PDCCH candidate belongs to a first monitoring unit, and the second PDCCH candidate belongs to a second monitoring unit; and determining, based on a monitoring capability of the terminal device, a candidate detection unit from the first monitoring unit and the second monitoring unit for detection.

2. The method according to claim 1, wherein the determining the associated monitoring occasions of the PDCCH according to the indication information, comprises:

in a case that the specific monitoring mode is a per span monitoring mode, determining that an association mode of the monitoring occasions is associating a monitoring occasion of the first search space set with a monitoring occasion of the second search space set based on the indication information.

3. The method according to claim 1, wherein the determining the associated monitoring occasions of the PDCCH according to the indication information, comprises:

in a case that the specific monitoring mode is a per span monitoring mode, determining that a repeated transmission mode of the PDCCH is intra-span repeated transmission based on the indication information: or, in a case that the indication information further comprises configuration information of intra-span repeated transmission, determining that a repeated transmission mode of the PDCCH is the intra-span repeated transmission:

wherein the associated monitoring occasions are within a same span:

wherein, for the intra-span repeated transmission mode, in a case that the first search space set and the second search space set in the same span have a same quantity of monitoring occasions, monitoring occasions of the first search space set within the span and monitoring occasions of the second search space set within the span are the associated monitoring occasions.

4. The method according to claim 1, wherein the determining the associated monitoring occasions of the PDCCH according to the indication information, comprises:

in a case that the specific monitoring mode is a per span monitoring mode, determining that a repeated transmission mode of the PDCCH is inter-span repeated transmission based on the indication information; or, in a case that the indication information further comprises that a repeated transmission mode of the PDCCH is inter-span repeated transmission, determining that the associated monitoring occasions are among different spans;

wherein, for the inter-span repeated transmission mode, two spans satisfying a first predefined relationship are associated spans;

wherein for the associated spans, any of following cases is comprised:

case 1: determining that in the associated spans, a monitoring occasion in the first search space set in any span and a monitoring occasion in the second search space set in another span are the associated monitoring occasions; and case 2: determining that in the associated spans, a monitoring occasion in the first search space set in any span and a monitoring occasion in the first search space set in another span are the associated monitoring occasions;

wherein the method further comprises: in a case that an unassociated span exists, determining that monitoring occasions in the unassociated span are all unassociated monitoring occasions, or determining that a repeated transmission mode of the PDCCH in the unassociated span is intra-slot repeated transmission.

5. The method according to claim 1, wherein the determining the associated monitoring occasions of the PDCCH according to the indication information, comprises:

in a case that the specific monitoring mode is a per slot monitoring mode and the indication information further comprises configuration information that a repeated transmission mode of the PDCCH is inter-slot repeated transmission, determining that the associated monitoring occasions are in different slots;

wherein, for the inter-slot repeated transmission mode, two slots satisfying a second predefined relationship are associated slots;

wherein for the associated slots, any of following cases is comprised:

case 1: in the associated slots, a monitoring occasion in the first search space set in any slot and a monitoring occasion in the second search space set in another slot are the associated monitoring occasions; and case 2: in the associated slots, a monitoring occasion in the first search space set in any slot and a monitoring occasion in the first search space set in another slot are the associated monitoring occasions;

wherein the method further comprises: in a case that an unassociated slot exists, determining that monitoring occasions in the unassociated slot are all unassociated monitoring occasions, or determining that a repeated transmission mode of the PDCCH in the unassociated slot is intra-slot repeated transmission.

6. The method according to claim 1, wherein the determining the associated monitoring occasions of the PDCCH according to the indication information, comprises:

in a case that the specific monitoring mode is a per slot monitoring mode, determining that a repeated transmission mode of the PDCCH is intra-slot repeated transmission based on the indication information; or in a case that the specific monitoring mode is a per span monitoring mode, determining that a repeated transmission mode of the PDCCH is intra-slot repeated transmission based on the indication information; or in a case that the specific monitoring mode is a per span monitoring mode and the indication information further comprises configuration information of intra-slot repeated transmission, determining that a repeated transmission mode of the PDCCH is the intra-slot repeated transmission;

wherein, for the intra-slot repeated transmission mode, in a case that the first search space set and the second search space set in a same slot have a same quantity of monitoring occasions, monitoring occasions of the first search space set within the slot and monitoring occasions of the second search space set within the slot are the associated monitoring occasions.

7. The method according to claim 1, wherein complexity of the first candidate detection unit is K, complexity of the first partial candidate detection unit is first partial complexity, and complexity of the second partial candidate detection unit is second partial complexity:

wherein the first partial complexity is same as the second partial complexity, or the first partial complexity is different from the second partial complexity.

8. The method according to claim 7, wherein a sum of the first partial complexity and the second partial complexity is K.

9. The method according to claim 1, wherein one span or one slot is one monitoring unit;

wherein the detecting the PDCCH according to the associated monitoring occasions, comprises:

for each monitoring unit, determining complexity of one candidate detection unit in the associated monitoring occasions as first complexity, and determining complexity of one candidate detection unit of any unassociated monitoring occasion as second complexity: wherein the candidate detection unit is a single PDCCH candidate or a PDCCH candidate pair; and determining, based on a monitoring capability of the terminal device in the monitoring unit, a candidate detection unit from candidate detection units in the monitoring unit for detection.

10. The method according to claim 9, wherein a partial candidate detection unit in two associated monitoring occasions in the monitoring unit belongs to the monitoring unit, and partial complexity in the first complexity belongs to the monitoring unit;

wherein the partial candidate detection unit is a candidate detection unit, which is within the monitoring unit, in the two associated monitoring occasions in the monitoring unit.

11. The method according to claim 9, wherein a complexity division mode of partial complexity comprises at least one of case 1, case 2, case 3, case 4, or case 5:

case 1: complexity of a partial candidate detection unit in one candidate detection unit in the associated monitoring occasions is third complexity, and a sum of third complexities of all partial candidate detection units in the one candidate detection unit is the first complexity:

case 2: in a case that the network device side configures independent decoding, complexity of a partial candidate detection unit of the monitoring unit is half of the first complexity:

case 3: the complexity of the partial candidate detection unit of the monitoring unit is half of the first complexity:

case 4: the complexity of the partial candidate detection unit of the monitoring unit is the second complexity:

case 5: in a case that the network device side configures joint decoding, complexity of a partial candidate detection unit of the monitoring unit is third complexity, and a sum of third complexities of all partial candidate detection units in one candidate detection unit is the first complexity.

12. A detection method for a physical downlink control channel, comprising:

sending indication information of a Physical Downlink Control Channel (PDCCH) to a terminal device, wherein the indication information at least comprises an association relationship between search space sets and a specific monitoring mode;

wherein the indication information is configured to determine associated monitoring occasions or associated search space sets of the PDCCH according to the indication information and detect the PDCCH according to the associated monitoring occasions or associated search space sets by the terminal device;

wherein the search space sets with the association relationship comprise a first search space set and a second search space set;

wherein one span or one slot is one monitoring unit;

wherein the PDCCH is detected according to the associated monitoring occasions or associated search space sets by:

determining a PDCCH candidate pair; wherein the PDCCH candidate pair comprises a first PDCCH candidate and a second PDCCH candidate, the first PDCCH candidate belongs to a first monitoring unit, and the second PDCCH candidate belongs to a second monitoring unit; and determining, based on a monitoring capability of the terminal device, a candidate detection unit from the first monitoring unit and the second monitoring unit for detection.

13. The method according to claim 12, wherein, in a case that the specific monitoring mode is a per span monitoring mode, the indication information further comprises configuration information of intra-span repeated transmission: or, in a case that the specific monitoring mode is a per slot monitoring mode, the indication information further comprises configuration information that a repeated transmission mode of the PDCCH is inter-slot repeated transmission: or, in a case that the specific monitoring mode is a per span monitoring mode, the indication information further comprises configuration information of intra-slot repeated transmission.

14. A terminal device, comprising: a processor, a memory and a transceiver; wherein:

the memory is configured to store a computer program:

the transceiver is configured to receive and send data under control of the processor; and the processor is configured to read the computer program in the memory and perform:

receiving indication information of a Physical Downlink Control Channel (PDCCH) sent by a network device side, wherein the indication information at least comprises an association relationship between search space sets and a specific monitoring mode:

determining associated monitoring occasions or associated search space sets of the PDCCH according to the indication information; and detecting the PDCCH according to the associated monitoring occasions or associated search space sets;

wherein the search space sets with the association relationship comprise a first search space set and a second search space set;

wherein one span or one slot is one monitoring unit;

wherein in a case of detecting the PDCCH according to the associated monitoring occasions or associated search space sets, the processor is configured to:

determine a PDCCH candidate pair; wherein the PDCCH candidate pair comprises a first PDCCH candidate and a second PDCCH candidate, the first PDCCH candidate belongs to a first monitoring unit, and the second PDCCH candidate belongs to a second monitoring unit; and determine, based on a monitoring capability of the terminal device, a candidate detection unit from the first monitoring unit and the second monitoring unit for detection.

15. The terminal device according to claim 14, wherein complexity of the first candidate detection unit is K, complexity of the first partial candidate detection unit is first partial complexity, and complexity of the second partial candidate detection unit is second partial complexity:

wherein the first partial complexity is same as the second partial complexity, or the first partial complexity is different from the second partial complexity.

16. The terminal device according to claim 15, wherein a sum of the first partial complexity and the second partial complexity is K.

17. A network device side, comprising: a processor, a memory and a transceiver; wherein:

the memory is configured to store a computer program:

the transceiver is configured to receive and send data under control of the processor; and the processor is configured to read the computer program in the memory and perform the method according to claim 12.

\* \* \* \* \*